United States Patent
Badam et al.

(10) Patent No.: US 9,939,862 B2
(45) Date of Patent: Apr. 10, 2018

(54) LATENCY-BASED ENERGY STORAGE DEVICE SELECTION

(71) Applicant: Microsoft Technology Licensing, LLC, Redmond, WA (US)

(72) Inventors: Anirudh Badam, Issaquah, WA (US); Ranveer Chandra, Redmond, WA (US); Nissanka Arachchige Bodhi Priyantha, Redmond, WA (US); Jonathan Alan Dutra, Redmond, WA (US); Julia L. Meinershagen, Redmond, WA (US); Stephen E. Hodges, Redmond, WA (US); Thomas Moscibroda, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 19 days.

(21) Appl. No.: 14/941,416

(22) Filed: Nov. 13, 2015

(65) Prior Publication Data

US 2017/0139465 A1 May 18, 2017

(51) Int. Cl.
G06F 1/26 (2006.01)
G06F 1/32 (2006.01)

(52) U.S. Cl.
CPC .............. G06F 1/263 (2013.01); G06F 1/26 (2013.01); G06F 1/3203 (2013.01);
(Continued)

(58) Field of Classification Search
CPC ............ G06F 1/263; G06F 1/26; G06F 1/329
See application file for complete search history.

(56) References Cited

U.S. PATENT DOCUMENTS

| | | |
|---|---|---|
| 4,145,669 A | 3/1979 | Babcock et al. |
| 5,091,819 A | 2/1992 | Christensen et al. |
| 5,315,228 A | 5/1994 | Hess et al. |
| 5,519,261 A | 5/1996 | Stewart |
| 5,543,245 A | 8/1996 | Andrieu et al. |
| 5,614,332 A | 3/1997 | Pavelle et al. |
| 5,684,404 A | 11/1997 | Millar |
| 5,691,742 A | 11/1997 | O'Connor et al. |
| 5,693,010 A | 12/1997 | Ledger et al. |
| 5,705,929 A | 1/1998 | Caravello et al. |
| 5,764,032 A | 6/1998 | Moore |
| 5,818,200 A | 10/1998 | Cummings et al. |
| 5,894,212 A | 4/1999 | Balogh |
| 5,914,585 A | 6/1999 | Grabon |
| 5,963,010 A | 10/1999 | Hayashi et al. |

(Continued)

FOREIGN PATENT DOCUMENTS

| | | |
|---|---|---|
| CN | 101714629 | 5/2010 |
| CN | 101834320 | 9/2010 |

(Continued)

OTHER PUBLICATIONS

Tu, "Image Parsing: Unifying Segmentation, Detection, and Recognition", Proceedings of the Ninth IEEE International Conference on Computer Vision (ICCV 2003) 2-Volume Set, 2003, 8 pages.

(Continued)

*Primary Examiner* — Stefan Stoynov

(57) ABSTRACT

Latency-based selections of energy storage devices are described herein. In implementations, latency behavior of computing tasks performed by a computing device is predicted for a period of time. Based on the predicted latency behavior of the computing device over the period of time, an assessment is made regarding which of multiple heterogeneous energy storage devices are most appropriate to service the system workload. For example, high energy density devices may be favored for latency sensitive tasks whereas high energy density devices may be favored when latency sensitivity is not a concern. A combination of energy storage devices to service the current workload is selected based upon the latency considerations and then power supply settings are adjusted to cause supply of power from the selected combination of energy storage devices during the time period.

20 Claims, 7 Drawing Sheets

(52) U.S. Cl.
CPC ............ *G06F 1/3206* (2013.01); *G06F 1/329* (2013.01); *G06F 1/3234* (2013.01)

(56) References Cited

U.S. PATENT DOCUMENTS

| | | | |
|---|---|---|---|
| 6,139,987 A | 10/2000 | Koo et al. | |
| 6,154,012 A | 11/2000 | Drori | |
| 6,252,511 B1 | 6/2001 | Mondshine et al. | |
| 6,258,473 B1 | 7/2001 | Spillman et al. | |
| 6,268,711 B1 | 7/2001 | Bearfield | |
| 6,299,998 B1 | 10/2001 | Morris et al. | |
| 6,346,794 B1 | 2/2002 | Odaohhara | |
| 6,353,304 B1 | 3/2002 | Atcitty et al. | |
| 6,417,646 B1 | 7/2002 | Huykman et al. | |
| 6,463,495 B1 | 10/2002 | Angelo et al. | |
| 6,650,089 B1 | 11/2003 | Freeman et al. | |
| 6,710,578 B1 | 3/2004 | Sklovsky | |
| 6,771,044 B1 | 8/2004 | Vinciguerra et al. | |
| 6,833,792 B1 | 12/2004 | Smith et al. | |
| 6,847,191 B1 | 1/2005 | Wang | |
| 6,920,404 B2 | 7/2005 | Yamanaka | |
| RE38,918 E | 12/2005 | Svensson et al. | |
| 6,977,479 B2 | 12/2005 | Hsu | |
| 6,992,580 B2 | 1/2006 | Kotzin et al. | |
| 7,015,596 B2 | 3/2006 | Pail | |
| 7,020,500 B2 | 3/2006 | Saghbini | |
| 7,059,769 B1 | 6/2006 | Potega | |
| 7,193,334 B2 | 3/2007 | Hiramitsu et al. | |
| 7,333,998 B2 | 2/2008 | Heckerman et al. | |
| 7,339,348 B2 | 3/2008 | Bui et al. | |
| 7,339,353 B1 | 3/2008 | Masias et al. | |
| 7,383,451 B2 | 6/2008 | Matsushima et al. | |
| 7,415,623 B2 | 8/2008 | Rapps et al. | |
| 7,430,675 B2 | 9/2008 | Lee | |
| 7,430,679 B2 | 9/2008 | Tevanian, Jr. | |
| 7,475,267 B1 | 1/2009 | Cocosel | |
| 7,531,989 B2 | 5/2009 | Maireanu | |
| 7,574,661 B2 | 8/2009 | Matsuura et al. | |
| 7,583,951 B2 | 9/2009 | Gibbs | |
| 7,684,942 B2 | 3/2010 | Yun et al. | |
| 7,716,500 B2 * | 5/2010 | Esliger .................. | G06F 1/3203 713/300 |
| 7,734,317 B2 * | 6/2010 | Patel ..................... | H02J 7/0013 320/129 |
| 7,787,405 B2 | 8/2010 | Dettinger et al. | |
| 7,814,348 B2 | 10/2010 | Krajcovic et al. | |
| 7,839,121 B2 | 11/2010 | Kim | |
| 7,944,662 B2 | 5/2011 | Carkner et al. | |
| 8,001,400 B2 | 8/2011 | Fadell | |
| 8,001,407 B2 | 8/2011 | Malone et al. | |
| 8,032,317 B2 | 10/2011 | Houston et al. | |
| 8,063,606 B2 | 11/2011 | Veselic | |
| 8,097,355 B2 | 1/2012 | Larsen | |
| 8,138,726 B2 | 3/2012 | Partin et al. | |
| 8,255,716 B2 | 8/2012 | Mandyam | |
| 8,258,748 B2 | 9/2012 | Constien et al. | |
| 8,313,864 B2 | 11/2012 | Christensen et al. | |
| 8,330,419 B2 | 12/2012 | Kim et al. | |
| 8,369,904 B2 | 2/2013 | Bennis et al. | |
| 8,386,816 B2 | 2/2013 | Elsilä et al. | |
| 8,386,826 B2 | 2/2013 | Newman | |
| 8,405,332 B1 | 3/2013 | Krishnamoorthy et al. | |
| 8,423,306 B2 | 4/2013 | Duncan | |
| 8,427,106 B2 | 4/2013 | Kim et al. | |
| 8,456,136 B2 | 6/2013 | Kim et al. | |
| 8,471,521 B2 | 6/2013 | Stewart et al. | |
| 8,482,254 B2 | 7/2013 | Ho | |
| 8,487,473 B2 | 7/2013 | Peterson et al. | |
| 8,508,191 B2 | 8/2013 | Kim et al. | |
| 8,538,686 B2 | 9/2013 | Gruen et al. | |
| 8,594,648 B2 | 11/2013 | Musial et al. | |
| 8,598,838 B2 | 12/2013 | Cunico | |
| 8,598,849 B2 | 12/2013 | Bhardwaj et al. | |
| 8,607,036 B2 | 12/2013 | More et al. | |
| 8,624,560 B2 | 1/2014 | Ungar et al. | |
| 8,629,652 B2 | 1/2014 | Partovi et al. | |
| 8,648,493 B2 | 2/2014 | Park | |
| 8,648,567 B2 | 2/2014 | Hoffman | |
| 8,665,214 B2 | 3/2014 | Forutanpour et al. | |
| 8,686,693 B2 | 4/2014 | Bhowmik et al. | |
| 8,732,487 B2 | 5/2014 | Goraczko et al. | |
| 8,749,193 B1 | 6/2014 | Sullivan | |
| 8,751,845 B2 | 6/2014 | Assad et al. | |
| 8,768,567 B2 | 7/2014 | Diab | |
| 8,795,875 B2 | 8/2014 | Lee et al. | |
| 8,803,479 B2 | 8/2014 | Kim | |
| 8,805,764 B1 | 8/2014 | Rhines et al. | |
| 8,829,847 B2 | 9/2014 | Eaton et al. | |
| 8,833,667 B2 | 9/2014 | Ahn et al. | |
| 8,847,551 B2 | 9/2014 | Coe et al. | |
| 8,898,485 B2 | 11/2014 | Scott et al. | |
| 8,922,329 B2 | 12/2014 | Davis et al. | |
| 8,949,629 B2 | 2/2015 | Chakra et al. | |
| 8,958,854 B1 | 2/2015 | Morley et al. | |
| 8,962,188 B2 | 2/2015 | Zhamu et al. | |
| 9,285,851 B2 | 3/2016 | Hodges et al. | |
| 9,475,398 B2 | 10/2016 | Borhan et al. | |
| 9,696,782 B2 | 7/2017 | Chandra et al. | |
| 9,748,765 B2 | 8/2017 | Huang et al. | |
| 9,760,138 B2 | 9/2017 | Huang et al. | |
| 9,793,570 B2 | 10/2017 | Chandra et al. | |
| 2001/0010456 A1 | 8/2001 | Kaite et al. | |
| 2001/0013767 A1 | 8/2001 | Takemoto | |
| 2001/0044332 A1 | 11/2001 | Yamada et al. | |
| 2002/0155327 A1 | 10/2002 | Faris | |
| 2003/0117143 A1 | 6/2003 | Okada | |
| 2003/0149904 A1 | 8/2003 | Kim | |
| 2004/0003300 A1 | 1/2004 | Malueg et al. | |
| 2004/0095096 A1 | 5/2004 | Melton et al. | |
| 2004/0101744 A1 | 5/2004 | Suzuki | |
| 2004/0198468 A1 | 10/2004 | Patel et al. | |
| 2004/0204183 A1 | 10/2004 | Lencevicius | |
| 2005/0189949 A1 | 9/2005 | Shimizu et al. | |
| 2005/0258686 A1 | 11/2005 | Hiramitsu et al. | |
| 2006/0066285 A1 | 3/2006 | Minamiura | |
| 2006/0087291 A1 | 4/2006 | Yamauchi | |
| 2006/0176017 A1 | 8/2006 | Waguespack | |
| 2006/0284618 A1 | 12/2006 | Cho, II et al. | |
| 2007/0007823 A1 | 1/2007 | Huang et al. | |
| 2007/0050647 A1 | 3/2007 | Conroy | |
| 2007/0103114 A1 | 5/2007 | Hoffman | |
| 2007/0252552 A1 | 11/2007 | Walrath | |
| 2008/0024007 A1 | 1/2008 | Budampati et al. | |
| 2008/0075367 A1 | 3/2008 | Winn et al. | |
| 2008/0082851 A1 | 4/2008 | Zettler | |
| 2008/0137989 A1 | 6/2008 | Ng et al. | |
| 2008/0176608 A1 | 7/2008 | Budampati et al. | |
| 2008/0201587 A1 | 8/2008 | Lee | |
| 2008/0218125 A1 | 9/2008 | Bansal et al. | |
| 2008/0234956 A1 | 9/2008 | Mizuno et al. | |
| 2008/0263375 A1 | 10/2008 | Sundstrom et al. | |
| 2009/0006878 A1 | 1/2009 | Borghetti et al. | |
| 2009/0007128 A1 | 1/2009 | Borghetti et al. | |
| 2009/0016765 A1 | 1/2009 | Honda | |
| 2009/0018785 A1 | 1/2009 | Huseth et al. | |
| 2009/0085553 A1 | 4/2009 | Kumar et al. | |
| 2009/0295397 A1 | 12/2009 | Barsukov | |
| 2010/0070334 A1 | 3/2010 | Monteverde | |
| 2010/0106994 A1 | 4/2010 | Challener et al. | |
| 2010/0121587 A1 | 5/2010 | Vian et al. | |
| 2010/0121588 A1 | 5/2010 | Elder et al. | |
| 2010/0123436 A1 | 5/2010 | Herrod et al. | |
| 2010/0164430 A1 | 7/2010 | Lu et al. | |
| 2010/0174928 A1 | 7/2010 | Borghetti et al. | |
| 2010/0201320 A1 | 8/2010 | Coe et al. | |
| 2010/0213897 A1 | 8/2010 | Tse | |
| 2010/0235007 A1 | 9/2010 | Constien et al. | |
| 2010/0304207 A1 | 12/2010 | Krammer | |
| 2010/0332876 A1 | 12/2010 | Fields et al. | |
| 2011/0016333 A1 | 1/2011 | Scott et al. | |
| 2011/0018679 A1 | 1/2011 | Davis et al. | |
| 2011/0025258 A1 | 2/2011 | Kim et al. | |
| 2011/0025259 A1 | 2/2011 | Toya et al. | |
| 2011/0057617 A1 | 3/2011 | Finberg et al. | |

(56) References Cited

U.S. PATENT DOCUMENTS

| | | |
|---|---|---|
| 2011/0115830 A1 | 5/2011 | Lee et al. |
| 2011/0161690 A1* | 6/2011 | Lin .................... G06F 1/26 713/300 |
| 2011/0171502 A1 | 7/2011 | Kottenstette et al. |
| 2011/0181242 A1 | 7/2011 | Lee |
| 2011/0187309 A1 | 8/2011 | Chan et al. |
| 2011/0234166 A1 | 9/2011 | Liu |
| 2011/0250512 A1 | 10/2011 | Friesen et al. |
| 2011/0260686 A1 | 10/2011 | Ford |
| 2011/0264899 A1 | 10/2011 | Evans et al. |
| 2011/0309838 A1 | 12/2011 | Lin |
| 2012/0004875 A1 | 1/2012 | Maeda et al. |
| 2012/0018679 A1 | 1/2012 | Davis et al. |
| 2012/0040210 A1 | 2/2012 | Hermann |
| 2012/0046892 A1 | 2/2012 | Fink |
| 2012/0058805 A1 | 3/2012 | Yoo |
| 2012/0074893 A1 | 3/2012 | Cole |
| 2012/0098705 A1 | 4/2012 | Yost et al. |
| 2012/0102407 A1 | 4/2012 | Benario et al. |
| 2012/0102504 A1 | 4/2012 | Iyer |
| 2012/0109519 A1 | 5/2012 | Uyeki |
| 2012/0119705 A1 | 5/2012 | Eberhard et al. |
| 2012/0119746 A1 | 5/2012 | Macris |
| 2012/0144215 A1 | 6/2012 | Naffziger et al. |
| 2012/0144221 A1 | 6/2012 | Naffziger et al. |
| 2012/0150247 A1 | 6/2012 | Meier et al. |
| 2012/0153899 A1 | 6/2012 | Marschalkowski et al. |
| 2012/0188714 A1 | 7/2012 | Von Borck et al. |
| 2012/0309455 A1 | 12/2012 | Klose et al. |
| 2012/0319652 A1 | 12/2012 | Namou et al. |
| 2012/0324578 A1 | 12/2012 | Seinfeld et al. |
| 2012/0326671 A1 | 12/2012 | Krause |
| 2013/0009604 A1 | 1/2013 | Bhardwaj et al. |
| 2013/0038274 A1 | 2/2013 | Forsythe |
| 2013/0043827 A1 | 2/2013 | Weinstein et al. |
| 2013/0099746 A1 | 4/2013 | Nork et al. |
| 2013/0106357 A1 | 5/2013 | Girard et al. |
| 2013/0143100 A1 | 6/2013 | Bennis et al. |
| 2013/0162430 A1 | 6/2013 | Scherzer et al. |
| 2013/0181511 A1 | 7/2013 | Stewart et al. |
| 2013/0191625 A1 | 7/2013 | Mullens et al. |
| 2013/0191662 A1 | 7/2013 | Ingrassia, Jr. et al. |
| 2013/0221926 A1 | 8/2013 | Furtner |
| 2013/0226486 A1 | 8/2013 | Henderson et al. |
| 2013/0257377 A1 | 10/2013 | Diamond et al. |
| 2013/0262899 A1 | 10/2013 | Frantz et al. |
| 2013/0275794 A1 | 10/2013 | Annavaram et al. |
| 2013/0325379 A1 | 12/2013 | Nakamura |
| 2013/0346001 A1 | 12/2013 | Park et al. |
| 2013/0346762 A1 | 12/2013 | Hodges et al. |
| 2014/0015488 A1 | 1/2014 | Despesse |
| 2014/0021887 A1 | 1/2014 | Keily et al. |
| 2014/0038054 A1 | 2/2014 | Tojigamori et al. |
| 2014/0043010 A1 | 2/2014 | Salem |
| 2014/0062388 A1 | 3/2014 | Kim |
| 2014/0082384 A1 | 3/2014 | De Cesare et al. |
| 2014/0093779 A1 | 4/2014 | Myung et al. |
| 2014/0095003 A1 | 4/2014 | Phillips et al. |
| 2014/0125344 A1 | 5/2014 | Knight et al. |
| 2014/0155100 A1 | 6/2014 | Baldasare et al. |
| 2014/0162112 A1 | 6/2014 | Ugaji et al. |
| 2014/0181551 A1 | 6/2014 | Rahal-Arabi et al. |
| 2014/0186700 A1 | 7/2014 | Bae et al. |
| 2014/0191263 A1 | 7/2014 | Funaba et al. |
| 2014/0203780 A1 | 7/2014 | Hu et al. |
| 2014/0253023 A1 | 9/2014 | Paryani et al. |
| 2014/0265604 A1 | 9/2014 | Mergener |
| 2014/0266061 A1 | 9/2014 | Wachal |
| 2014/0278074 A1 | 9/2014 | Annapureddy et al. |
| 2014/0288737 A1 | 9/2014 | Ryu et al. |
| 2014/0312828 A1 | 10/2014 | Vo et al. |
| 2014/0375252 A1 | 12/2014 | Ford |
| 2015/0004473 A1 | 1/2015 | Lim et al. |
| 2015/0020016 A1 | 1/2015 | Hanumara et al. |
| 2015/0084602 A1 | 3/2015 | Sawyers et al. |
| 2015/0089261 A1 | 3/2015 | Segawa et al. |
| 2015/0125743 A1 | 5/2015 | Edwards et al. |
| 2015/0188188 A1 | 7/2015 | Zhang et al. |
| 2015/0194707 A1 | 7/2015 | Park |
| 2015/0207344 A1 | 7/2015 | Wang et al. |
| 2015/0309547 A1 | 10/2015 | Huang et al. |
| 2015/0329003 A1 | 11/2015 | Li et al. |
| 2015/0339415 A1 | 11/2015 | Klein et al. |
| 2015/0351037 A1 | 12/2015 | Brown et al. |
| 2016/0114696 A1 | 4/2016 | Eifert et al. |
| 2016/0231387 A1 | 8/2016 | Hodges et al. |
| 2016/0231801 A1 | 8/2016 | Chandra et al. |
| 2016/0240891 A1 | 8/2016 | Hodges et al. |
| 2016/0241048 A1 | 8/2016 | Badam et al. |
| 2016/0248125 A1 | 8/2016 | Huang et al. |
| 2016/0248266 A1 | 8/2016 | Ferrese et al. |
| 2016/0254664 A1 | 9/2016 | Huang et al. |
| 2016/0275400 A1 | 9/2016 | Hodges et al. |
| 2017/0108906 A1 | 4/2017 | Chandra et al. |
| 2017/0139459 A1 | 5/2017 | Badam et al. |
| 2017/0162899 A1 | 6/2017 | Chandra et al. |
| 2017/0269670 A1 | 9/2017 | Chandra et al. |
| 2017/0317493 A1 | 11/2017 | Huang et al. |

FOREIGN PATENT DOCUMENTS

| | | |
|---|---|---|
| CN | 102230953 | 11/2011 |
| CN | 202424488 | 9/2012 |
| CN | 103226184 | 7/2013 |
| CN | 103683255 | 3/2014 |
| EP | 1798100 | 6/2007 |
| EP | 1906295 | 4/2008 |
| EP | 2296246 | 3/2011 |
| EP | 2590050 | 5/2013 |
| EP | 2682840 | 1/2014 |
| GB | 2446168 | 8/2008 |
| JP | H0410366 | 1/1992 |
| JP | H0684544 | 3/1994 |
| JP | 2009278754 | 11/2009 |
| JP | 2010006436 | 3/2010 |
| JP | 2012243463 | 12/2012 |
| KR | 20070095689 | 10/2007 |
| KR | 20090064813 | 6/2009 |
| KR | 20140140906 | 12/2014 |
| WO | WO-9401914 | 1/1994 |
| WO | WO-9933124 | 7/1999 |
| WO | WO-03021409 | 3/2003 |
| WO | WO-2007127788 | 11/2007 |
| WO | WO-2008133951 | 11/2008 |
| WO | WO-2011127251 | 10/2011 |
| WO | WO-2012109048 | 8/2012 |
| WO | WO-2012140401 | 10/2012 |
| WO | WO-2013019899 | 2/2013 |
| WO | WO-2013052678 | 4/2013 |
| WO | WO-2013060802 | 5/2013 |
| WO | WO-2013145000 | 10/2013 |
| WO | WO-2013163695 | 11/2013 |
| WO | WO-2014098037 | 6/2014 |
| WO | WO-2015029332 | 3/2015 |
| WO | WO-2015123290 | 8/2015 |
| WO | WO-2016149702 | 9/2016 |
| WO | WO-2016197109 | 12/2016 |

OTHER PUBLICATIONS

"Advanced Configuration and Power Interface", Retrieved from <http://www.acpi.info/> on Nov. 3, 2014, Jul. 23, 2014, 2 pages.

"Anker", Retrieved on: Aug. 13, 2015—Available at: http://www.ianker.com/ExternalBatteries/category-c1-s1, 9 pages.

"Anode active material for Lithium-ion-battery-Gramax", Retrieved from <http://www.ogc.co.jp/e/procducts/battery/> on Nov. 3, 2014, 2 pages.

"Anode Materials", Retrieved from <http://www.targary.com/li-ion-battery/anode-materials> on Nov. 3, 2014, Nov. 1, 2010, 2 pages.

"Arbin BT-2000 Battery Testing Equipment", Retrieved on: Aug. 13, 2015—Available at: http://www.arbin.com/products/battery, 2 pages.

(56) References Cited

OTHER PUBLICATIONS

"Battery and Power Subsystem Hardware Design", Retrieved From: <https://msdn.microsoft.com/en-us/library/windows/hardware/dn481323(v=vs.85).aspx> Aug. 5, 2015, Jun. 30, 2014, 4 pages.
"Battery Anodes", Retrieved on Sep. 23, 2015 Available at: http://www.emc2.cornell.edu/content/view/battery-anodes.html, 8 pages.
"Boltzmann Machines and Deep Belief Networks", Retrieved from <http://plearn.berlios.de/machine_learning/node4.html> on Jun. 22, 2009, 7 pages.
"Cell Trak", Retrieved from <http://celltraksystems.com/monitoring_parameters.html> on Nov. 4, 2014, Aug. 16, 2013, 4 pages.
"DS2782 Stand-Alone Fuel Gauge IC", Retrieved From: <http://www.maximintegrated.com/en/products/power/battery-management/DS2782.html/tb_tab0> Aug. 6, 2015, 3 pages.
"Final Office Action", U.S. Appl. No. 12/503,605, dated Sep. 20, 2012, 12 pages.
"Final Office Action", U.S. Appl. No. 13/530,130, dated Apr. 22, 2015, 7 pages.
"Ford Developers Look to Use Google Prediction API to Optimize Energy Efficiency", Retrieved from <http://corporate.ford.com/news-center/press-releases-detail/pr-ford-developers-look-to-use-google-34591> on Nov. 11, 2014, May 10, 2011, 1 page.
"Google Now", Retrieved on: Aug. 13, 2015—Available at: http://www.google.com/landing/now/, 1 page.
"Hey Siri, what's the Best Sushi Place in Town?", Retrieved on: Aug. 13, 2015—Available at: https://www.apple.com/ios/siri/, 5 pages.
"iFixit iPad Air 2 Teardown", Retrieved on: Aug. 13, 2015—Available at: https://www.ifixit.com/Teardown/iPad+Air+2+Teardown/30592, 12 pages.
"iFixit Microsoft Surface Pro 3 Teardown", Retrieved on: Aug. 13, 2015—Available at: https://www.ifixit.com/Teardown/Microsoft+Surface+Pro+3+Teardown/26595, 17 pages.
"iFixit Samsung Galaxy Note 10.1 Teardown", Retrieved on: Aug. 13, 2015 Available at: https://www.ifixit.com/Teardown/Samsung+Galaxy+Note+10.1+Teardown/10144, 13 pages.
"International Search Report and Written Opinion", Application No. PCT/US2015/026052, dated Jul. 23, 2015, 10 pages.
"MacBook", Retrieved on: Aug. 13, 2015—Available at: http://www.apple.com/macbook/design/, 14 pages.
"MACCOR-Model 4200", Retrieved on: Aug. 13, 2015—Available at: http://www.maccor.com/Products/Model4200.aspx, 2 pages.
"Maxim-Parametric Search Product Table", Retrieved on: Aug. 13, 2015—Available at: http://para.maximintegrated.com/en/results.mvp?fam=batt_stat295=Fuel%26nbsp%3BGauge&1379=ModelGauge, 2 pages.
"Mophie Juice Pack Helium", Retrieved on: Aug. 13, 2015—Available at: http://www.mophie.com/shop/iphone-5/juice-pack-helium-iphone-5, 7 pages.
"Non-Final Office Action", U.S. Appl. No. 12/503,605, dated Jan. 12, 2012, 11 pages.
"Non-Final Office Action", U.S. Appl. No. 12/503,605, dated Oct. 4, 2013, 14 pages.
"Non-Final Office Action", U.S. Appl. No. 13/530,130, dated Oct. 3, 2014, 8 pages.
"Notice of Allowance", U.S. Appl. No. 12/503,605, dated Jul. 23, 2014, 5 pages.
"On-the-Go and Embedded Host Supplement to the USB Revision 2.0 Specification", Retrieved from <<http://www.usb.org/developers/onthego/USB_OTG_and_EH_2-0.pdf>> on Sep. 21, 2009, May 8, 2009, 79 pages.
"Qualcomm Quick Charge", Retrieved on: Aug. 13, 2015—Available at: https://www.qualcomm.com/products/snapdragon/quick-charge, 9 pages.
"Skoda Navigation", Retrieved from <https://skoda.garmin.com/skoda/site/productOverview> on Oct. 27, 2014, Jan. 23, 2014, 1 page.
"Surface Power Cover", Retrieved on: Aug. 13, 2015—Available at: http://www.microsoft.com/surface/en-us/support/hardware-and-drivers/power-cover?os=windows-10, 8 pages.
"The PASCAL Visual Object Classes Challenges 2008 (VOC2008) Results", Retrieved from <<http://pascallin.ecs.soton.ac.uk/challengesNOC/voc2008/results/index.shtml>> on Jun. 19, 2009, Jun. 22, 2009, 5 pages.
"Understanding Lithium-ion-Battery University", Retrieved on: Sep. 23, 2015 Available at: http://batteryuniversity.com/learn/article/understanding_lithium_ion, 8 pages.
Ackley,"A Learning Algorithm for Boltzmann Machines", Cognitive Science 9, pp. 147-169, 1985, 23 pages.
Albertus,"Experiments on and Modeling of Positive Electrodes with Multiple Active Materials for Lithium-Ion Batteries", In Journal of the Electrochemical Society, vol. 156, Issue 7, May 14, 2009, 1 page.
Allen,"Microfabricated Fast-Charging Energy Storage Devices", Retrieved from <http://yprize.upenn.edu/technology/fast-charging-batteries> on Nov. 3, 2014, 2014, 2 pages.
Balan,"The Case for Cyber Foraging", In Proceedings of the 10th workshop on ACM SIGOPS European Workshop, Jul. 2002, 6 pages.
Balasubramanian,"Energy Consumption in Mobile Phones: A Measurement Study and Implications for Network Applications", Proceedings of the 9th ACM SIGCOMM conference on Internet measurement conference (IMC), Retrieved at <<http://www.cs.umass.edu/-arunab/paper/tailender-imc09.pdf>>, Nov. 4, 2009, 14 Pages.
Banerjee,"Users and Batteries: Interactions and Adaptive Energy Management in Mobile Systems", In Proceedings of the 9th International Conference on Ubiquitous Computing, Sep. 2007, 18 pages.
Bashash,"Battery Health-conscious Plug-in Hybrid Electric Vehicle Grid Demand Prediction", In Proceedings of the ASME Dynamic Systems and Control Conference, Sep. 13, 2010, 9 pages.
Benini,"Battery-Driven Dynamic Power Management of Portable Systems", In Proceedings 13th International Symposium on System Synthesis, Sep. 20, 2000, 6 pages.
Benini,"Discharge Current Steering for Battery Lifetime Optimization", In Proceedings of the International Symposium on Low Power Electronics and Design, Aug. 12, 2002, pp. 118-123.
Benini,"Extending Lifetime of Portable Systems by Battery Scheduling", In Proceedings of the conference on Design, automation and test in Europe, Mar. 13, 2001, 5 pages.
Benini,"Scheduling Battery Usage in Mobile Systems", In IEEE Transactions on Very Large Scale Integration Systems, vol. 11, Issue 6, Dec. 2003, pp. 1136-1143.
Bickford,"Security versus Energy Tradeoffs in Host-Based Mobile Malware Detection", In Proceedings of 9th International Conference on Mobile Systems, Applications, and Services, Jun. 28, 2011, pp. 225-238.
Borkar,"Intel Look Inside", Available at: http://www.intel.com/content/dam/www/public/us/en/documents/presentation/advancing-moores-law-in-2014-presentation.pdf, Aug. 11, 2014, 68 pages.
Carroll,"An Analysis of Power Consumption in a Smartphone", In Proceedings of USENIX Annual Technical Conference, Jun. 23, 2010, 14 pages.
Chan,"A New Battery Model for use with Battery Energy Storage Systems and Electric Vehicles Power Systems", In IEEE Power Engineering Society Winter Meeting, vol. 1, Jan. 23, 2000, 6 pages.
Chang,"The State of Charge Estimating Methods for Battery: A Review", In Proceeding of the ISRN Applied Mathematics, May 12, 2013, 8 pages.
Chen,"An Accurate Electrical Battery Model Capable of Predicting Runtime and I—V Performance", In Proceeding of the IEEE Transactions on Energy Conversion, vol. 21, Issue 2, Jun. 5, 2006, 8 pages.
Chiasserini,"Energy Efficient Battery Management", In IEEE Journal on Selected Areas in Communications, vol. 19, Issue 7, Jul. 2001, pp. 1235-1245.
Chiasson,"Estimating the State of Charge of a Battery", In Proceedings of IEEE Transactions on Control Systems Technology, vol. 13, Issue 3, Apr. 25, 2005, 6 pages.

(56) References Cited

OTHER PUBLICATIONS

Chikkannanavara,"A Review of Blended Cathode Materials for Use in Li-Ion Batteries", In Journal of Power Sources, vol. 248, Feb. 15, 2015, 2 Pages.
Clark,"New Tech Allows Lithium Batteries to Charge Faster, and Hold Charge Longer", Available at: http://www.gizmag.com/lithium-batteries-charge-faster-hold-longer/20550/, Oct. 20, 2015, 8 pages.
Clark,"These solar-Powered Benches Charge Phones for Free", Retrieved from <http://www.wired.co.uk/news/archive/2014-07/09/soofa> on Nov. 3, 2014, Jul. 9, 2014, 4 pages.
Cosby,"Multiple battery chemistries, single device!", Retrieved From: <https://e2e.ti.com/blogs_/b/fullycharged/archive/2015/06/16/multiple-battery-chemistries-single-device> Aug. 6, 2015, Jun. 16, 2015, 3 pages.
Dong,"Self-Constructive High-Rate System Energy Modeling for Battery-Powered Mobile Systems", In Proceedings of the 9th international conference on Mobile systems, applications, and services, Jun. 28, 2011, 14 pages.
Erdinc,"A Dynamic Lithium-Ion Battery Model considering the Effects of Temperature and Capacity Fading", In Proceedings of International Conference on Clean Electrical Power, 060/9/2009, pp. 383-386.
Fairley,"Software Looks at the Road Ahead to Boost Hybrid-Car Efficiency", Retrieved from <http://spectrum.ieee.org/transportation/systems/software-looks-at-the-road-ahead-to-boost-hybridcar-efficiency> on Nov. 11, 2014, Feb. 3, 2009, 1 page.
Flinn,"Energy-Aware Adaptation for Mobile Applications", In Proceedings of the Seventeenth ACM Symposium on Operating Systems Principles, Dec. 1999, pp. 48-63.
Flinn,"Managing Battery Lifetime with Energy-Aware Adaptation", In Journal of ACM Transactions on Computer Systems, vol. 22, Issue 2, May 2004, 43 pages.
Fonseca,"Quanto: Tracking Energy in Networked Embedded Systems", In Proceedings of 8th USENIX Conference on Operating Systems Design and Implementation, Dec. 8, 2008, 16 pages.
Fox,"Automatic Construction of Efficient Multiple Battery Usage Policies", In Proceedings of the Twenty-Second International Joint Conference on Artificial Intelligence, Jun. 11, 2011, 6 pages.
Freund,"Unsupervised Learning of Distributions on Binary Vectors Using Two Layer Networks", Baskin Center for Computer Engineering & Information Sciences, University of California, Santa Cruz, UCSC-CRL-94-25, Jun. 22, 1994, 41 pages.
Gao,"Dynamic Lithium-Ion Battery Model for System Simulation", In Journal of IEEE Transactions on Components and Packaging Technologies, vol. 25, No. 3, Sep. 2002, pp. 495-505.
Gonder,"Route-Based Control of Hybrid Electric Vehicles", In SAE Technical Paper, Apr. 14, 2008, 11 pages.
Gong,"Trip Based Optimal Power Management of Plug-in Hybrid Electric Vehicle with Advanced Traffic Modeling", In SAE International Journal of Engines, Apr. 14, 2008, 1 page.
Gong,"Trip Based Optimal Power Management of Plug-in Hybrid Electric Vehicles Using Gas-Kinetic Traffic Flow Model", In Proceedings of American Control Conference, Jun. 11, 2008, 6 pages.
Groiβ,"The Influence of Temperature on the Operation of Batteries and Other Electrochemical Energy Storage Systems", Retrieved from <http://www.basytec.de/Literatur/temperature/DE_2002.htm> on Nov. 3, 2014, Jan. 8, 2003, 7 pages.
Gu,"Thermal-Electrochemical Modeling of Battery Systems", In Journal of Electrochemical Society, Jan. 28, 2000, 41 pages.
Hayakawa,"Incentive Based Multi-Objective Optimization in Electric Vehicle Navigation including Battery Charging", In Proceedings of the International Federation of Automatic Control, Aug. 24, 2014, 7 pages.
He,"State-of-Charge Estimation of the Lithium-Ion Battery Using an Adaptive Extended Kalman Filter Based on an Improved Thevenin Model", In Proceedings of IEEE Transactions on Vehicular Technology, vol. 60, Issue 4, May 2011, pp. 1461-1469.
He,"Vehicle-Infrastructure Integration-Enabled Plug-in Hybrid Electric Vehicles for Optimizing Energy Consumption", In Transportation Research Board 90th Annual Meeting Compendium of Papers DVD, Jan. 23, 2011, 14 pages.
Heath,"Code Transformations for Energy Efficient Device Management", In Journal of IEEE Transactions on Computers, vol. 53, Issue 8, Aug. 2004, 37 pages.
Higgins,"Informed Mobile Prefetching", In Proceedings of the 10th international conference on Mobile systems, applications, and services, Jun. 25, 2012, pp. 155-168.
Hinton,"A Fast Learning Algorithm for Deep Belief Nets", Retrieved from <<http://www.cs.toronto.edu/-hinton/absps/fastnc.pdf>> on Jun. 19, 2009, 2006, 16 pages.
Johnson,"Temperature Dependent Battery Models for High-Power Lithium-Ion Batteries", In 17th Annual Electric Vehicle Symposium, Oct. 15, 2000, 17 pages.
Jongerden,"Lifetime Improvement by Battery Scheduling", In Proceedings of the 16th international GI/ITG conference on Measurement, Modelling, and Evaluation of Computing Systems and Dependability and Fault Tolerance, Mar. 19, 2012, 15 pages.
Jongerden,"Maximizing System Lifetime by Battery Scheduling", In Proceeding of the IEEE/IFIP International Conference on Dependable Systems & Networks, Jun. 29, 2009, 10 pages.
Katsargyri,"Optimally Controlling Hybrid Electric Vehicles using Path Forecasting", In Proceedings of American Control Conference, Jun. 10, 2009, 6 pages.
Keshav,"Energy efficient scheduling in 4G smart phones for Mobile Hotspot Application", In Proceedings: National Conference on Communications, Feb. 3, 2012, 5 Pages.
Kohli,"Robust Higher Order Potentials for Enforcing Label Consistency", Retrieved from <<http://research.microsoft.com/en-us/um/people/pkohli/papers/klt_cvpr08.pdf>> on Jun. 19, 2009, 8 pages.
Korhonen,"Predicting Mobile Device Battery Life", In Master's Thesis, Feb. 28, 2011, 62 pages.
Koushanfar,"Hybrid Heterogeneous Energy Supply Networks", In IEEE International Symposium on Circuits and Systems, May 15, 2011, 4 pages.
Krumm,"Predestination: Inferring Destinations from Partial Trajectories", UbiComp 2006: The Eighth International Conference on Ubiquitous Computing, Sep. 17-21, 2006, Orange County, CA, retrieved from <http://research.microsoft.com/en-us/um/people/horvitzlpredestination.pdf> on Feb. 5, 2009, Sep. 17, 2006, 18 pages.
Krumm,"Predestination: Where Do You Want to Go Today?", In Journal of Computer, vol. 40, Issue 4, Apr. 2007, 4 pages.
Krumm,"Where Will They Turn: Predicting Turn Proportions at Intersections", In Journal of Personal and Ubiquitous Computing, vol. 14, Issue 7, Oct. 2010, 14 pages.
Kumar,"Discriminative Random Fields", International Journal of Computer Vision 68(2), 179-201, 2006, 23 pages.
Laasonen,"Adaptive On-Device Location Recognition", In Proceedings of the 2nd International Conference on Pervasive Computing, Researchers and Practitioners, Apr. 2004, pp. 287-304.
LaMarca,"Place Lab: Device Positioning Using Radio Beacons in the Wild", In Proceedings of Pervasive 2005, Munich, Germany, retrieved from <http://www.placelab.org/publications/pubs/pervasive-placelab-2005-final.pdf> on Feb. 5, 2009, May 2005, 18 pages.
Langari,"Intelligent Energy Management Agent for a Parallel Hybrid Vehicle—Part I: System Architecture and Design of the Driving Situation Identification Process", In IEEE Transactions on Vehicular Technology, vol. 54, Issue 3, May 23, 2005, 10 pages.
Larochelle,"An Empirical Evaluation of Deep Architectures on Problems with Many Factors of Variation", University of Montreal, CIAR Summer School, Aug. 9, 2007, 24 pages.
Lee,"Sparse Deep Belief Net Model for Visual Area V2", Computer Science Department, Stanford University, Retrieved from <<http://books.nips.cc/papers/files/nips20/NIPS20070934.pdf>> on Jun. 19, 2009, 8 pages.
Lu,"A Scalable and Programmable Architecture for the Continuous Restricted Boltzmann Machine in VLSI", The Department of Electrical Engineering, The National Tsing-Hua University, Taiwan, IEEE, 2007, pp. 1297-1300, 2007, 4 pages.

(56) References Cited

OTHER PUBLICATIONS

Mak,"Infrastructure Planning for Electric Vehicles with Battery Swapping", In Journal of Academic Science, vol. 59, Issue 7, Jul. 2013, 33 pages.

Man,"Towards a Hybrid Approach to SoC Estimation for a Smart Battery Management System (BMS) and Battery Supported Cyber-Physical Systems (CPS)", In Proceeding of the 2nd Baltic Congress on Future Internet Communications, Apr. 25, 2012, 4 pages.

Mandal,"IntellBatt: Towards Smarter Battery Design", In Proceedings of 45th ACM/IEEE Design Automation Conference, Jun. 8, 2008, 6 pages.

Miettinen,"Energy Efficiency of Mobile Clients in Cloud Computing", In Proceedings of the 2nd USENIX conference on Hot topics in cloud computing, Jun. 22, 2010, 7 pages.

Miliche,"A First Experimental Investigation of the Practical Efficiency of Battery Scheduling", In Proceedings of 23th International Conference on Architecture of Computing Systems,, Feb. 22, 2010, 6 pages.

MIT"Reality Commons", Retrieved from <http://realitycommons.media.mit.edu/> on Nov. 3, 2014, 2014, 2 pages.

Mittal,"Empowering Developers to Estimate App Energy Consumption", In Proceedings of the 18th annual international conference on Mobile computing and networking, Aug. 22, 2012, pp. 317-328.

Musardo,"A-ECMS: An Adaptive Algorithm for Hybrid Electric Vehicle Energy Management", In Proceedings of the 44th IEEE Conference on Decision and Control, and the European Control Conference, Dec. 12, 2005, 8 pages.

Osindero,"Modeling Image Patches with a Directed Hierarchy of Markov Random Fields", Retrieved from <<http://www.cs.toronto.edu/-hinton/absps/lateral.pdf>> on Jun. 19, 2009, 8 pages.

Panigrahi,"Battery Life Estimation of Mobile Embedded Systems", In Proceeding of the Fourteenth International Conference on VLSI Design, Jan. 2001, 7 pages.

Pathak,"Fine-Grained Power Modeling for Smartphones using System Call Tracing", In Proceedings of the sixth conference on Computer systems, Apr. 10, 2011, pp. 153-168.

Pathak,"Where is the Energy Spent Inside My App? Fine Grained Energy Accounting on Smartphones with Eprof", In Proceedings of the 7th ACM European conference on Computer Systems, Apr. 10, 2012, pp. 29-42.

Prigg,"Charged in 30 seconds: Israeli Firm Claims Battery Breakthrough that could Change the way we Power Phones and Laptops", Retrieved from <http://www.dailymail.co.uk/sciencetech/article-2599243/Charged-30-seconds-Israeli-firm-claims-battery-breakthrough-change-way-charge-phones-laptops.html> on Nov. 3, 2014, Apr. 7, 2014, 6 pages.

Qian,"Profiling Resource Usage for Mobile Applications: A Cross-layer Approach", In Proceedings of the 9th international conference on Mobile systems, applications, and services, Jun. 28, 2011, 14 pages.

Ranzato,"Sparse Feature Learning for Deep Belief Networks", Retrieved from <<http://yann.lecun.com/exdb/publis/pdf/ranzato-nips-07.pdf>> on Jun. 19, 2009, 8 pages.

Rao,"Analysis of Discharge Techniques for Multiple Battery Systems", In Proceedings of the International Symposium on Low Power Electronics and Design, Aug. 25, 2003, pp. 44-47.

Rao,"Battery Modeling for Energy-Aware System Design", In Journal of Computer, vol. 36, Issue 12, Dec. 2012, 11 pages.

Ravi,"Context-aware Battery Management for Mobile Phones", Proceedings of the Sixth Annual IEEE International Conference on Pervasive Computing and Communications (PERCOM), Retrieved at <<http://www.cs.rutgers.edu/discolab/smartphone/papers/percom08.pdf>>, 2008, 10 Pages.

Ravi,"Context-aware Battery Management for Mobile Phones: A Feasibility Study", In Proceedings of IEEE International Conference on Pervasive Computing and Communications, 2006, 16 pages.

Richard,"Google's Prediction API Could Optimize Your Car's Fuel Efficiency", Retrieved from <http://www.treehugger.com/cars/googles-prediction-api-could-optimize-your-cars-fuel-efficiency.html> on Nov. 11, 2014, May 18, 2011, 3 pages.

Rong,"An Analytical Model for Predicting the Remaining Battery Capacity Prediction for Lithium-Ion Batteries", In Proceedings of the conference on Design, Automation and Test in Europe—vol. 1, Mar. 2003, 2 pages.

Ross,"A Systematic Approach to Learning Object Segmentation from Motion", MIT Computer Science and AI Laboratory, Retrieved from <<http://web.mit.edu/mgross/www/publications/mgrlpk-cvw-paper-03.pdf>> on Jun. 19, 2009, 8 pages.

Roth,"Fields of Experts: A Framework for Learning Image Priors", IEEE, Retrieved from <<http://ieeexplore.ieee.org/stamp/stamp.jsp?tp=&isnumber=31473&arnumber=1467533>> on Jun. 19, 2009, 8 pages.

Roy,"Energy Management in Mobile Devices with Cinder Operating System", In Proceedings of the sixth conference on Computer systems, 004/10/2011, pp. 139-152.

Sachenbacher,"Modeling and Optimization for Efficient Electrical Mobility: Challenges from the E-Tour Project", In Proceedings of First International Workshop on Constraint Reasoning and Optimization for Computational Sustainability, Sep. 20, 2009, 2 pages.

Sathiyanarayanan,"Maximization Battery Lifetime and Improving Efficiency", In Proceedings of International Conference on Devices, Circuits and Systems, Mar. 15, 2012, 4 pages.

Shanklin,"Samsung Gear Live vs. Gear 2", Available at: http://www.gizmag.com/samsung-gear-live-vs-gear-2-smartwatch-comparison/32775/, Jul. 1, 2014, 17 pages.

Shotton,"Semantic Texton Forests for Image Categorization and Segmentation", IEEE, Retrieved from <<http://ieeexplore.ieee.org/stamp/stamp.jsp?tp=&arnumber=4587503&isnumber=4587335>> on Jun. 19, 2009, 2008, 8 pages.

Shotton,"TextonBoost for Image Understanding: Multi-Class Object Recognition and Segmentation by Jointly Modeling Texture, Layout, and Context", Retrieved from <<http://johnwinn.org/Publications/papers/TextonBoost_IJCV2009.pdf>> on Jun. 19, 2009, Jul. 2, 2007, 30 pages.

Shye,"Into the wild: Studying real user activity patterns to guide power optimizations for mobile architectures", In Proceedings of 42nd Annual IEEE/ACM International Symposium on Microarchitecture,, Dec. 12, 2009, pp. 168-178.

Simpson,"Characteristics of Rechargeable Batteries", In Literature No. SNVA533, 2011, 12 pages.

Smolensky,"Information Processing in Dynamical Systems: Foundations of Harmony Theory", CU-CS-321-86, University of Colorado at Boulder, Department of Computer Science, Retrieved from, Feb. 1986, 55 pages.

Srinivasan,"This week in batteries (TWiB)", Available at: http://thisweekinbatteries.blogspot.in/2010_06_01_archive.html, Jun. 28, 2015, 4 pages.

Strommer,"NFC-enabled Wireless Charging", In Proceedings of the 4th International Workshop on Near Field Communication, Mar. 13, 2012, 6 pages.

Styler,"Active Management of a Heterogeneous Energy Store for Electric Vehicles", In IEEE Forum on Integrated and Sustainable Transportation System, Jun. 29, 2011, 6 pages.

Styler,"Active Management of a Heterogeneous Energy Store for Electric Vehicles", Retrieved from: <http://repository.cmu.edu/cgi/viewcontent.cgi?article=1845&context=robotics> on Jun. 29, 2011, 8 Pages.

Thiagarajan,"Who Killed My Battery: Analyzing Mobile Browser Energy Consumption", In Proceedings of the 21st international conference on World Wide Web, Apr. 16, 2012, pp. 41-50.

"Notice of Allowance", U.S. Appl. No. 13/530,130, dated Nov. 6, 2015, 5 pages.

"International Search Report and Written Opinion", Application No. PCT/US2016/016037, dated Apr. 8, 2016, 10 pages.

"International Search Report and Written Opinion", Application No. PCT/US2016/016033, dated May 9, 2016, 10 pages.

"International Search Report and Written Opinion", Application No. PCT/US2016/016671, dated May 11, 2016, 10 pages.

"International Search Report and Written Opinion", Application No. PCT/US2016/015493, dated Apr. 4, 2016, 11 pages.

(56) References Cited

OTHER PUBLICATIONS

"International Search Report and Written Opinion", Application No. PCT/US2016/016034, dated Apr. 14, 2016, 16 pages.
"Final Office Action", U.S. Appl. No. 14/617,751, dated Mar. 10, 2017, 11 pages.
"International Preliminary Report on Patentability", Application No. PCT/US2016/016671, dated Feb. 22, 2017, 6 pages.
"International Search Report and Written Opinion", Application No. PCT/US2016/063741, dated Mar. 22, 2017, 13 pages.
"International Search Report and Written Opinion", Application No. PCT/US2016/060415, dated Feb. 22, 2017, 16 pages.
"Non-Final Office Action", U.S. Appl. No. 14/626,518, dated Mar. 27, 2017, 24 pages.
"Notice of Allowance", U.S. Appl. No. 14/617,719, dated Mar. 1, 2017, 5 pages.
"Notice of Allowance", U.S. Appl. No. 14/633,009, dated Apr. 18, 2017, 7 pages.
"Final Office Action", U.S. Appl. No. 14/617,719, dated Dec. 12, 2016, 10 pages.
"International Preliminary Report on Patentability", Application No. PCT/US2016/016037, dated Nov. 24, 2016, 6 pages.
"International Search Report and Written Opinion", Application No. PCT/US2016/055238, dated Jan. 19, 2017, 11 pages.
"Non-Final Office Action", U.S. Appl. No. 14/262,205, dated Dec. 23, 2016, 6 pages.
"Non-Final Office Action", U.S. Appl. No. 14/626,600, dated Feb. 13, 2017, 27 pages.
"Non-Final Office Action", U.S. Appl. No. 14/943,967, dated Jan. 3, 2017, 11 pages.
"Restriction Requirement", U.S. Appl. No. 14/624,808, dated Feb. 23, 2017, 6 pages.
"Second Written Opinion", Application No. PCT/US2016/016034, dated Jan. 17, 2017, 8 pages.
"International Preliminary Report on Patentability", Application No. PCT/US2016/016033, dated Nov. 7, 2016, 6 pages.
"International Preliminary Report on Patentability", Application No. PCT/US2015/026052, dated Jul. 27, 2016, 8 pages.
"Non-Final Office Action", U.S. Appl. No. 14/624,825, dated Nov. 18, 2016, 33 pages.
"Non-Final Office Action", U.S. Appl. No. 14/633,009, dated Dec. 1, 2016, 7 pages.
"Second Written Opinion", Application No. PCT/US2016/016670, dated Nov. 18, 2016, 6 pages.
"Second Written Opinion", Application No. PCT/US2015/026052, dated Mar. 29, 2016, 6 pages.
"International Search Report and Written Opinion", Application No. PCT/US2016/016670, dated Sep. 14, 2016, 23 pages.
"International Search Report and Written Opinion", Application No. PCT/US2016/016669, dated Sep. 30, 2016, 24 pages.
"Non-Final Office Action", U.S. Appl. No. 14/617,719, dated Aug. 22, 2016, 9 pages.
"Non-Final Office Action", U.S. Appl. No. 14/617,751, dated Aug. 25, 2016, 10 pages.
"Non-Final Office Action", U.S. Appl. No. 14/885,858, dated Oct. 7, 2016, 18 pages.
"Second Written Opinion", Application No. PCT/US2016/015493, dated Jul. 28, 2016, 5 pages.
"Second Written Opinion", Application No. PCT/US2016/016037, dated Sep. 1, 2016, 5 pages.
"Corrected Notice of Allowance", U.S. Appl. No. 14/617,719, dated May 30, 2017, 2 pages.
"Corrected Notice of Allowance", U.S. Appl. No. 14/617,719, dated Jun. 8, 2017, 2 pages.
"Corrected Notice of Allowance", U.S. Appl. No. 14/633,009, dated Jul. 28, 2017, 2 pages.
"Corrected Notice of Allowance", U.S. Appl. No. 14/633,009, dated Jun. 7, 2017, 4 pages.
"Final Office Action", U.S. Appl. No. 14/885,858, dated Jun. 9, 2017, 22 pages.
"International Preliminary Report on Patentability", Application No. PCT/US2016/015493, dated Apr. 21, 2017, 6 pages.
"International Preliminary Report on Patentability", Application No. PCT/US2016/016669, dated Mar. 10, 2017, 7 pages.
"International Preliminary Report on Patentability", Application No. PCT/US2016/016670, dated May 12, 2017, 7 pages.
"International Preliminary Report on Patentability", Application No. PCT/US2016/016034, dated Aug. 4, 2017, 9 pages.
"Non-Final Office Action", U.S. Appl. No. 14/617,751, dated Jun. 30, 2017, 11 pages.
"Non-Final Office Action", U.S. Appl. No. 14/624,808, dated May 23, 2017, 5 pages.
"Non-Final Office Action", U.S. Appl. No. 14/662,938, dated Aug. 9, 2017, 33 pages.
"Non-Final Office Action", U.S. Appl. No. 14/959,265, dated Apr. 21, 2017, 8 pages.
"Notice of Allowance", U.S. Appl. No. 14/262,205, dated May 31, 2017, 5 pages.
"Notice of Allowance", U.S. Appl. No. 14/959,265, dated Jun. 29, 2017, 5 pages.
"Final Office Action", U.S. Appl. No. 14/626,600, dated Nov. 16, 2017, 31 pages.
"Final Office Action", U.S. Appl. No. 14/943,967, dated Oct. 19, 2017, 10 pages.
"Foreign Office Action", EP Application No. 15719556.1, dated Sep. 14, 2017, 4 pages.
"Second Written Opinion", Application No. PCT/US2016/055238, dated Sep. 27, 2017, 6 pages.
"Second Written Opinion", Application No. PCT/US2016/063741, dated Sep. 29, 2017, 6 pages.
"Final Office Action", U.S. Appl. No. 14/617,751, dated Feb. 5, 2018, 11 pages.
"Final Office Action", U.S. Appl. No. 14/617,751, dated Feb. 13, 2018, 14 pages.
"Final Office Action", U.S. Appl. No. 14/624,808, dated Dec. 29, 2017, 6 pages.
"Final Office Action", U.S. Appl. No. 14/626,518, dated Jan. 11, 2018, 37 pages.
"Final Office Action", U.S. Appl. No. 14/662,938, dated Feb. 21, 2018, 44 pages.

\* cited by examiner

LATENCY-BASED ENERGY STORAGE DEVICE SELECTION

BACKGROUND

As technology has advanced, mobile computing devices have become increasingly commonplace. Mobile computing devices provide various functionality to users, allowing the user to interact with the device to check email, surf the web, compose text messages, interact with applications, and so on. One challenge that faces developers of mobile computing devices is efficient power management and extension of battery life. For example, extended processing of tasks by processors at or near capacity may drain the device battery, causing the device to shut down. Various power management strategies may be applied to control processor and battery utilization generally at the expense of overall device performance. If power management implemented for a device fails to strike a good balance between performance and battery life, user dissatisfaction with the device and manufacturer may result.

SUMMARY

In accordance with one or more embodiments, in a computing device having multiple heterogeneous energy storage devices, latency behavior of computing tasks performed by a computing device is predicted for a period of time. Based on the predicted latency behavior of the computing device over the period of time, an assessment is made regarding which of the multiple heterogeneous energy storage devices are most appropriate to service the system workload. For example, high power density devices may be favored for latency sensitive tasks whereas high energy density devices may be favored when latency sensitivity is not a concern. A combination of energy storage devices to service the current workload is selected based upon the latency considerations and then power supply settings are adjusted to cause supply of power from the selected combination of energy storage devices during the time period. This may involve setting a power ratio to control power draw from the multiple heterogeneous energy storage devices as designated for the predicted latency behavior.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Latency-based energy storage device selection is described for a device having an energy storage device system with heterogeneous energy storage devices, such as heterogeneous battery cells. The heterogeneous energy storage devices include two or more energy storage devices having various different characteristics such as different sizes, capacities, technologies, chemistries, shapes, state of charge (SOC), age, temperature, cycle counts, and so forth. These different characteristics result in different energy storage devices being better suited for different types of operations and scenarios. For example, one energy storage device may be a high power density device more efficient at providing larger amounts of energy over shorter amounts of time (e.g., during latency sensitive tasks such as video processing) and another energy storage device may be a high energy density device more efficient at providing smaller amounts of energy over longer amounts of time (e.g., while a device is in a low-power usage or energy saving mode). Generally, a high power density device charges fast and are capable of supplying a high power output. In contrast, a high energy density device is designed to operate efficiently, but provides lower power output and may be more susceptible to aging and degradation from repeated charge cycles.

The techniques discussed herein use latency behavior information regarding applications, computing tasks, interaction scenarios and/or past usage of a computing device to assess latency sensitivity of a workload and adjust power draws across multiple heterogeneous energy storage devices. Adjusting the combination of storage devices used for different levels of latency sensitivity as discussed in this document improves performance and efficiency of the energy storage device system both in the short term for handling latency sensitive tasks and over time as individual devices age and cycle counts increase.

In the discussion that follows, a section titled "Operating Environment" is provided and describes one example environment in which one or more implementations can be employed. Following this, a section titled "Latency-Based Energy Storage Device Selection System Details" describes example details and procedures in accordance with one or more implementations. Last, a section titled "Example System" describes example computing systems, components, and devices that can be utilized for one or more implementations of latency-based energy storage device selection.

Operating Environment

Figure 1:
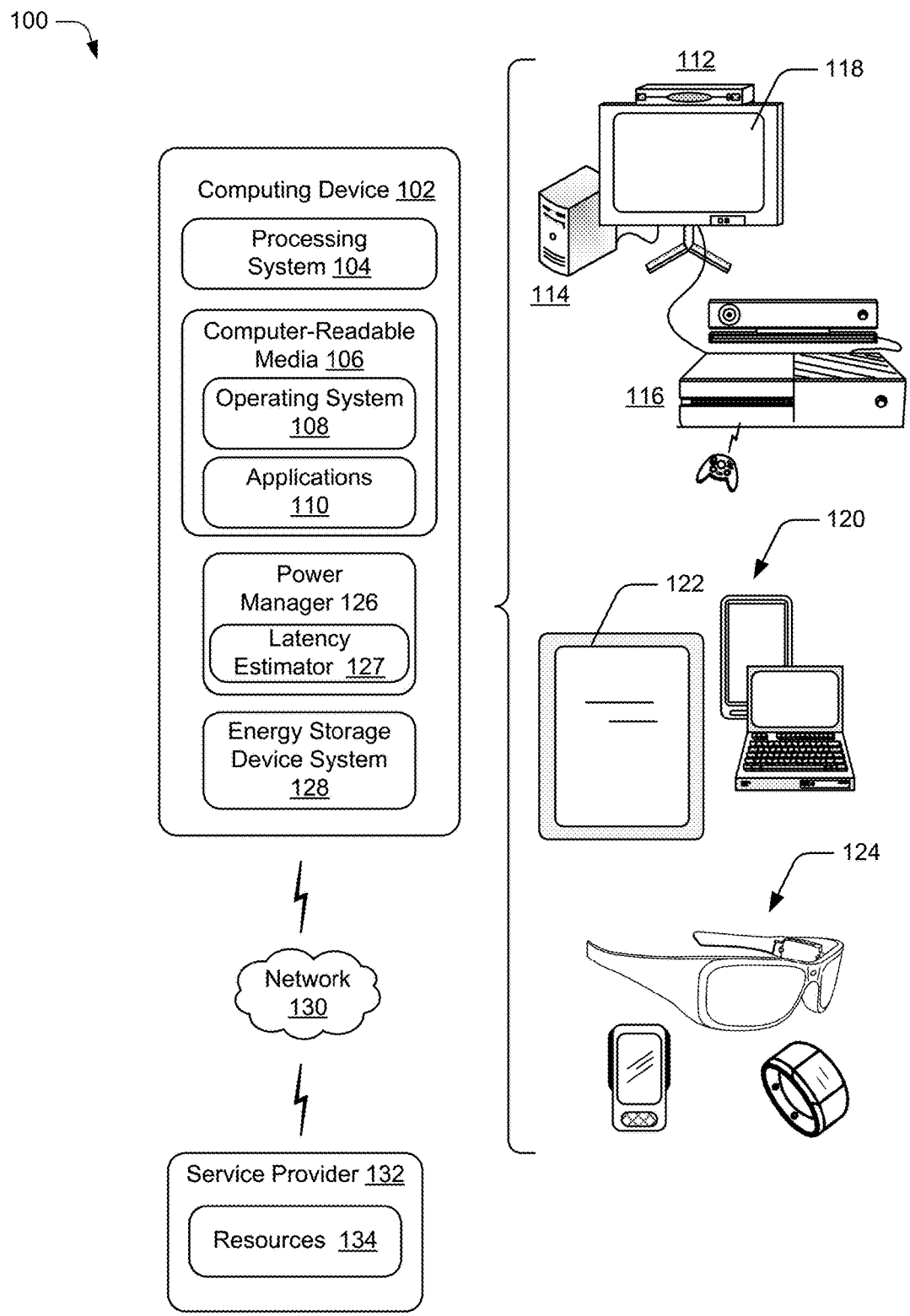
FIG. 1 illustrates an operating environment in accordance with one or more embodiments.

FIG. 1 illustrates an operating environment in accordance with one or more embodiments, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may be configured to include multiple independent processors configured in parallel or in series and one or more multi-core processing units. A multi-core processing unit may have two or more processors ("cores") included on the same chip or integrated circuit. In one or more implementations, the processing system 104 may include multiple processing cores that provide a range of performance capabilities, processing efficiencies, and power usage characteristics.

The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include game files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of wearable devices 124 depicted in FIG. 1 include glasses, a smart band or watch, and a pod device such as clip-on fitness device, media player, or tracker. Other examples of wearable devices 124 include but are not limited to badges, a key fob, an access card, and a ring, an article of clothing, a glove, or a bracelet, to name a few examples. Any of the computing devices can be implemented with various components, such as one or more processors and memory devices, as well as with any combination of differing components. One example of a computing system that can represent various systems and/or devices including the computing device 102 is shown and described below in relation to FIG. 7.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 7.

The computing device 102 may also include a power manager 126 that includes or makes use of a latency estimator 127, and an energy storage device system 128 having multiple heterogeneous energy storage devices that operate as described above and below. The power manager 126 represents functionality operable to manage power for the computing device in various ways. For example the power manager 126 may assess system-wide power management considerations and manage availability heterogeneous energy storage devices, processors, and/or processing cores based on the assessment. In one or more implementations, the power manager 126 is configured to implement a switching policy established based on power management considerations to control the battery system 128. The switching policy depends at least upon latency considerations as discussed herein.

In this context, the latency estimator 127 represents functionality that the power manager may include, invoke, or otherwise make use of to determine latency behavior for a current workload (also referred to herein as usage behavior) of the computing device 102 and manage heterogeneous energy storage devices of the energy storage device system 128 accordingly. This may involve analyzing factors including but not limited to energy storage device characteristics, latency sensitivity of different tasks, application specific latency considerations, estimated or predicted future usage and latency behavior of the computing device 102, estimated future energy usage of the computing device 102 over a given time period (e.g., a day), and so forth.

The assessment may further involve analyzing other factors including but not limited to, charge levels/states, the device power state, actual and expected workloads, thermal conditions, user presence, processor/core utilization, application context, device context, priority, contextual clues, and other suitable performance metrics that may be used to drive power management decisions at the system level. Different types of applications, tasks, and scenarios may be assigned pre-computed latency sensitivity values that are used by the latency estimator 127 to determine latency behavior for a current workload. Latency estimator 127 may additionally operate to estimate or predict latency sensitivity values "on-demand" using the various factors when pre-computed values are not available.

The power manager 126 is further configured to apply the switching policy to adjust the performance of the battery system 128 based on the assessment of system-wide performance metrics and conditions (e.g., analyzing an operational context for the device), including at least latency sensitivity associated with current workload. Applying the switching policy may involve controlling modes of different energy storage devices (e.g., cells), states of individual energy storage devices and/or availability of heterogeneous energy storage devices included with an energy storage system 128. For example, the power manager 126 is operable to communicate control signals or otherwise interact with the energy storage system 128 to direct operation of switching hardware to switch between heterogeneous battery cells to service the load in accordance with the switching policy and analysis of the operational context.

As mentioned, the energy storage device system 128 is configured to include multiple heterogeneous energy storage devices. Energy storage devices may be configured in various ways and be implemented in various combinations of as discussed in greater detail below. The power manager 126 and energy storage device system 128 may be provided using any suitable combination of hardware, software, firmware, and/or logic devices. As illustrated, the power manager 126 and energy storage device system 128 may be configured as separate, standalone systems. In addition or alternatively, the power manager 126 may also be configured as a system or module that is combined with the operating system 108 or implemented via a controller or other component of the energy storage device system 128. Details regarding these and other aspects of latency-based energy storage device selection are discussed in the following section.

The environment 100 further depicts that the computing device 102 may be communicatively coupled via a network 130 to a service provider 132, which enables the computing device 102 to access and interact with various resources 134 made available by the service provider 132. The resources 134 can include any suitable combination of content and/or services typically made available over a network by one or more service providers. For instance, content can include various combinations of text, video, ads, audio, multi-media streams, applications, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Having described an example operating environment, consider now example details and techniques associated with one or more implementations of latency-based energy storage device selection.

Latency-Based Energy Storage Device Selection System Details

To further illustrate, consider the discussion in this section of example devices, components, procedures, and implementation details that may be utilized to provide latency-based energy storage device selection as described herein. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Device

Figure 2:
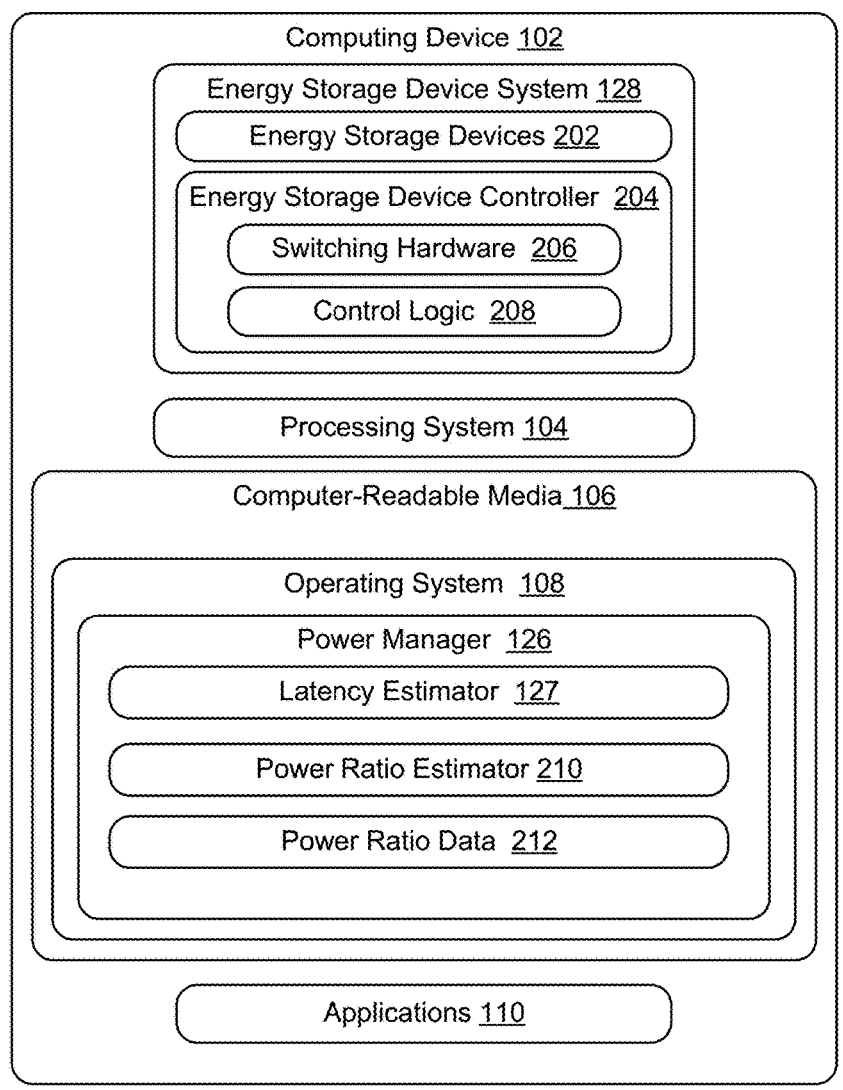
FIG. 2 depicts example details of a computing device having an energy storage device system with heterogeneous energy storage devices in accordance with one or more implementations.

FIG. 2 depicts generally at 200 example details of a computing device 102 having an energy storage device system 128 with heterogeneous energy storage devices in accordance with one or more implementations. Computing device 102 also includes processing system 104, computer readable media 106, operating system 108 and applications 110 as discussed in relation to FIG. 1. In the depicted example, a power manager 126 is also shown as being implemented as a component of the operating system 108.

By way of example and not limitation, the energy storage device system 128 is depicted as having energy storage devices 202 and an energy storage device controller 204. The energy storage devices 202 are representative of various different kinds of energy storage devices that may be included with the computing device 102. These energy storage devices can include, for example, battery cells, supercapacitors, and so forth. It should be noted that these energy storage devices include various devices that store energy as opposed to being an external plug-in AC power source. As mentioned, energy storage devices 202 include energy storage devices having different characteristics such as different sizes/capacities, chemistries, battery technologies, shapes, state of charge (SOC), age, temperature, and so forth (heterogeneous energy storage devices). The different characteristics may include different "properties" of the energy storage devices (e.g., chemistries, sizes, capacities) and different "states" in which the energy storage devices are currently operating (e.g., "SoC", age, temperature). Thus, in the context of the techniques described herein heterogeneous energy storage devices may include either or both of different types of devices designed with different properties and devices having the same or similar properties by design, but having different state characteristics.

Accordingly, the energy storage device system 128 includes a diverse combination of multiple energy storage devices at least some of which have different characteristics one to another. However, it should be noted that some energy storage devices 202 may be the same and still be part of the energy storage device system 128 (e.g., the energy storage devices 202 may include three battery cells, two of which have the same characteristics and a third of which has one or more characteristics that are different than the first two battery cells). It should also be noted that energy storage devices may be heterogeneous despite sharing one or more characteristics (e.g., two battery cells may have the same capacities but have different battery technologies and different shapes). Various combinations of energy storage devices 202 may be utilized to provide a range of capacities, performance capabilities, efficiencies, and power usage characteristics. In at least some implementations, the energy storage devices 202 include a combination including at least one high energy density device and one high power energy device. This type of combination enables high power delivery in some situations for critical and latency sensitive tasks, and fast charging in other situations to keep the computing device operational and increase overall battery life.

Generally, high power density devices are more efficient at providing larger amounts of energy over shorter amounts of time (e.g., during latency sensitive tasks such as video processing). The high power density devices may charge fast and provide high power output. On the other hand, high energy density devices are designed to operate efficiently and may have larger capacities. However, the high energy density devices supply less power and may not be suitable for latency sensitive tasks. Additionally, the high energy density devices are more susceptible to increases cycle counts, which can accelerate aging and degradation over time. Situationally selecting an appropriate combination of different batteries to use, charge, and drain in accordance with techniques described herein enables increase performance and more efficient use of the energy storage device system 128. Additionally, cycle counts can be controlled and balanced to avoid having some energy storage devices 202 age much faster than other energy storage devices 202. In the context of latency sensitive tasks, a bulk of the power can be supplied via high power density device, which enables support for greater processing performance without adversely affecting the cycle count and lifetime of the high energy density devices.

The energy storage device controller 204 is representative of a control system to control operation of the energy storage device system 128 and delivery of power from the energy storage devices 202 to service a system load of the computing device 102. The system load refers to the energy required by the computing device 102 at any given point in time in order to operate. The energy storage device controller 204 may be configured using various logic, hardware, circuitry, firmware, and/or software suitable to connect the energy storage devices 202 one to another, supply power to the system, switch between the energy storage devices, and so forth. By way of example and not limitation, the energy storage device controller 204 in FIG. 2 is depicted as including switching hardware 206 and control logic 208 that is operable to selectively switch between different designated energy storage devices 202 at different times. Control logic 208 may reflect different switching modes that switch between drawing power from different ones of the energy storage devices 202 so that power is drawn from energy storage devices 202 in accordance with a particular power ratio as determined by the power manager 126. Thus, rather than merely interconnecting energy storage devices in parallel or series, switching hardware 206 can be utilized to set-up a switching scheme to select different energy storage devices based on different factors and workload patterns for the computing device 102. Similarly, control logic 208 may reflect different switching modes that switch between providing power to different energy storage devices 202 to charge energy storage devices 202 in accordance with a particular power ratio as determined by the power manager 126. Thus, charging and discharging modes depend at least in part upon latency considerations as discussed herein.

In one approach, selection of an energy storage device 202 occurs under the influence of the power manager 126. As noted previously, the power manager 126 represents functionality operable to manage the energy storage devices 202 and makes policy decisions regarding how to charge and discharge the device according to various criteria. The selection of an energy storage device 202 refers to selection of a particular one or more of the energy storage devices 202 and an amount of power that is to be drawn from each of the selected one or more energy storage devices. This selection of the amount of power that is to be drawn can be identified by a power ratio of one energy storage device to another. A power ratio of x.y can be used, where x refers to power drawn from a first energy storage device and y refers to power drawn from a second energy storage device. For example, a power ratio of 4:1 indicates that four times the amount of power is to be drawn from the first energy storage device than from the second energy storage device. Similar power ratios can be used in situations in which there are three or more energy storage devices, such as a power ratio x1:x2: . . . :xm, where x1 refers to power drawn from a first energy storage device, x2 refers to power drawn from a second energy storage device, and xm refers to power drawn from an mth energy storage device. For example, a power ratio of 4:2:1:1 indicates that: the amount of power to be drawn from the first energy storage device is twice the amount of power to be drawn from the second energy storage device and four times the amount of power to be drawn from each of the third and fourth energy storage devices, the amount of power to be drawn from the second energy storage device is twice the amount of power to be drawn from each of the third and fourth energy storage devices, and the amount of power to be drawn from the third energy storage device is the same as the amount of power to be drawn from the fourth energy storage device.

As noted, the selection of an energy storage device 202 and setting of power ratio is based at least in part upon latency considerations. Functionality to assess latency behavior for tasks, applications, and workloads is represented by the latency estimator 127, which the power manager 126 may rely upon to inform power management decisions. The latency behavior assessment involves identifying latency sensitive tasks, applications, and workloads that benefit from higher power and processing frequencies (e.g., a high power mode). The assessment may also be based upon the priority assigned to tasks and the current state of the energy storage device system. When latency sensitivity is determined to exceed an established threshold associated with a "high" level of sensitivity, the power manager 126 is configured to favor use of high power density devices over high energy density device to increase performance (e.g., reduce latency). For non-sensitive tasks, the power manager 126 is configured to favor use of high energy density devices over high power density devices to conserve charge and availability of the high power density devices.

In one approach, a table, list, file or other suitable data structure that correlates different tasks, applications, and scenarios to latency sensitivity is compiled and maintained via the latency estimator 127. This latency data is used to assess the latency for a particular workload over a period time (e.g., an epoch) based on the set of tasks, applications, scenarios, etc. corresponding to the workload. Based on the applications that are launched and tasks that are scheduled, latency data can be used to look-up sensitivity for individual applications/tasks listed in the latency data and make an overall determination regarding the degree to which the current workload is latency sensitive. For unknown applications and tasks (e.g., items not available in the compiled list) the latency estimator 127 may operate to predict the latency sensitivity for such items. Information regarding sensitivity that is predicted may be used to update the listed tasks/applications. The predictions may be based on similarity to known items. For example, different applications of the same class (e.g., video players, image editors, desktop productivity apps, email clients, etc.) may be assigned similar values with respect to latency based on similarity. Additionally, the latency estimator 127 may also consider the processing context to predict whether items may benefit from higher processing performance or not. For example, if an application is network bandwidth or I/O bottlenecked then increasing power is unlikely to have a substantial effect. On the other hand, if the computing device is operating with low power and the processing system is at or near the applicable power cap, there may be room to increase performance by favoring high power energy density devices. In addition or alternatively, information regarding latency sensitivity may be available through a service via a service provider 132. In this approach, the data structure that correlates different tasks, applications, and scenarios to latency sensitivity may be obtained and updated through interaction with the service. Various other techniques to assess latency sensitivity are also contemplated.

The power manager 126 operates to make power management decisions based as least in part upon the latency assessments as just described. Although this document focuses on latency-based decisions and selections, power management decisions may also depend upon other factors including but not limited to predicted energy consumption, expected usage of the computing device, availability of charging opportunities, user behavior and schedules, geographic location, and characteristics of the energy storage device systems and individual devices, to name a few examples. Such additional factors may be employed in combination with latency considerations and also in connection with non-latency sensitive workloads to control both charging and discharging of the system of heterogeneous energy storage devices.

The power manager 126 uses predicted latency as determined by the latency estimator 127, alone or in combination with other factors, to select an appropriate combination of energy storage devices to service the current workload and direct changes to switching hardware 206 to use the selected combination. For example, the power manager 126 may communicate control signals or other suitable data that is interpreted and applied by the control logic 208 to operate switching hardware 206 to draw power as specified by the power manager 126 for a given time frame or epoch. In one or more implementations, selection of the combination of energy storage devices involves setting a power ratio for drawing power from the energy storage device 202 to control the division of the power load among the energy storage devices. This power ratio is used by the control logic 208 to determine which energy storage device(s) to draw power from at any given time. The power ratio may reflect decimal or fractional values for the division of the power. The power ratio may also be expressed as amounts of power draw (e.g., number of watts) for each individual device. In another approach, a number of modes corresponding to different ratios may be established and the mode may be selected based upon the latency assessment.

Accordingly, the power manager 126 may include or otherwise make use of a power ratio estimator module 210 and power ratio data 212. The power ratio estimator module 210 represents functionality operable to use the information gathered and generated by power manager 126 to determine the ratios in which power is to be drawn from the various energy storage devices in the energy storage device system 128. At any given time, the power ratio estimator module 210 determines ratios to utilize for a period of time (e.g., epoch) based at least upon predicted latency sensitivity during the period of time. Such determinations can be made by the power ratio estimator module 210 at various regular or irregular intervals. For example, the power ratio estimator module 210 can make this determination every minute or second, after the amount of time in a current epoch elapses (e.g., at the beginning of each epoch), and so forth.

The power ratio data 212 represents data used by the power ratio estimator module 210. The power ratio data 212 can be implemented as any of a variety of different data structures (e.g., a table, list, or other record), or as any of a variety of different formulas, rules, algorithms, and so forth. The power ratio specifies a division of an overall power load between different energy storage devices. This may be expressed in terms of percentage loads, amounts of power draw, time factors, or otherwise. In one or more embodiments, the power ratio data 218 is a table of threshold values for latency and corresponding power ratios. The power ratio estimator module 210 accesses the power ratio data 212, compares the combined estimated latency to the threshold values in the power ratio data 212, and sets the power ratio for the computing device as the power ratio corresponding to the threshold values.

Table I illustrates an example table that can be used as power ratio data 218. It should be noted that the table illustrated in Table I is an example, and that other data structures, formulas, algorithms, and so forth can be used.

TABLE I

| Latency Sensitivity Value | Power Ratio |
| --- | --- |
| Below threshold 1 | Ratio 1 |
| Between threshold 1 and threshold 2 | Ratio 2 |
| Above threshold 2 | Ratio 3 |

Thus, as shown in Table I, three different power ratios are available, depending on the combined latency sensitivity. Although only three power ratios and two threshold values (threshold 1 and threshold 2) are shown, any number of power ratios and threshold values can be used. The power manager 126 is thus able to manage heterogeneous energy storage devices to select different combinations of devices and set power draw ratios and/or divisions of power based upon the latency behavior and perceived latency sensitivity of different tasks, applications, workloads, and interaction scenarios.

Example Battery Cell Arrangement

Generally speaking, an energy storage device system 128 having multiple diverse energy storage devices may be configured in various ways and employ a variety of different types of energy storage devices. In one or more implementations, different energy storage devices 202 included with a system have different characteristics, such as differences in one or more of battery chemistry, capacity, voltage, size, shapes and/or state of charge (SOC), to name a few examples. Using different types of energy storage devices provides flexibility for design of the energy storage device system and circuit boards, and consequently enables device developers to make better utilization of internal space to provide devices having increased battery life and efficiency. The different energy storage devices are arranged in a circuit that enables selective switching among the energy storage devices.

Figure 3:
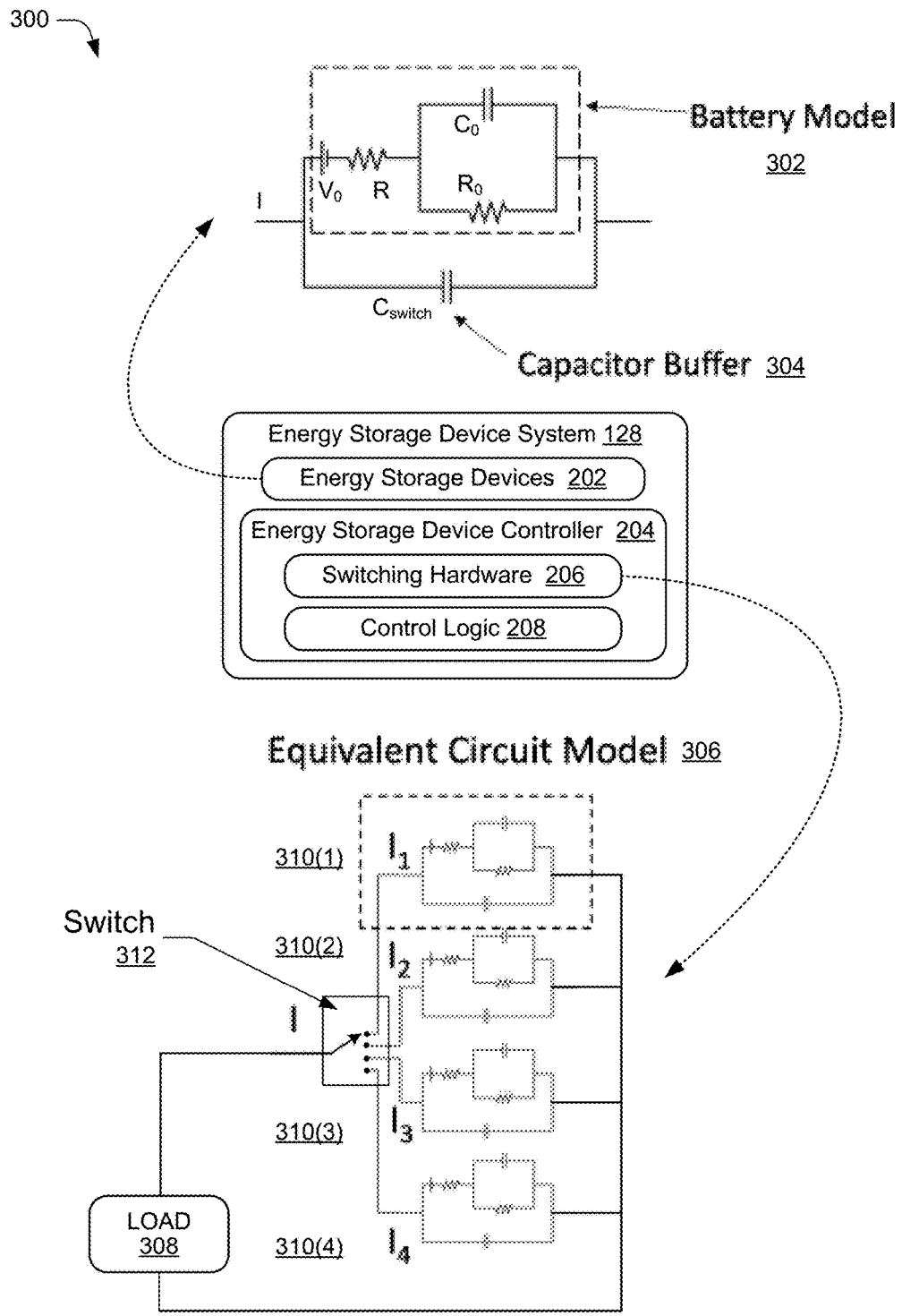
FIG. 3 depicts one illustrative example arrangement of an energy storage device system having multiple energy storage devices that are battery cells.

In particular, FIG. 3 depicts generally at 300 one illustrative example arrangement of an energy storage device system 128 having multiple energy storage devices 202 that are battery cells. The energy storage devices 202 may be connected in a circuit that includes an energy storage device controller 204 that implements switching hardware 206 and control logic 208 to switch back and forth among the energy storage devices 202.

Each of the energy storage devices 202 may be represented according to a battery model 302 an example of which is depicted in FIG. 3. Each of the battery cells may also be coupled to a capacitor buffer 304, which is provided to smooth out the supplied power when the switching hardware 206 is employed to switch between cells. Although one illustrative example of a battery model 302 is shown in FIG. 3, it is to be appreciated that the concepts described herein are not limited to a particular model and various different models may be utilized, individually or in combination. Generally, multiple energy storage devices 202 are arranged together with switching hardware 206 that enables switching between the energy storage devices. The switching circuit may also include a mechanism to smooth the current draw from different energy storage devices, such as the example capacitor buffer 304 or other smoothing components. Additionally, the switching circuit includes control logic 208 or comparable functionality to designate and control which of the energy storage devices are used to service the load, the mode of operation of the energy storage devices, and the amount of power that is drawn from each energy storage device. The control logic 208 controls the amount of power that is drawn from each energy storage device in accordance with the power ratio determined by the schedule-based energy storage device selection system 126.

The battery controller 204 and switching hardware 206 may be configured to support multiple different modes of operation for energy storage devices 202. In one mode, the switching hardware 206 is controlled to select one energy storage device at a time from which current is drawn to support the load. The particular energy storage device that is selected at any given time is dependent upon the determined power ratio.

In another mode, the switching hardware 206 is controlled to cycle rapidly between two or more different energy storage devices to draw a percentage of the overall load current from each energy storage device. In other words, the switching hardware 206 is cycled at a relatively high frequency to pull current from different energy storage devices according to the determined power ratio. Effectively, the rapid cycling in this mode enables servicing of the load by drawing different portions of load current from different cells at the same time. For example, for an energy storage device system having three cells and a determined power ratio of 7:2:1, seventy percent of the load may be drawn from a first energy storage device, twenty percent from a second energy storage device, and ten percent from a third energy storage device.

In yet another mode, the switching hardware 206 is controlled to cycle rapidly between or connect to two or more different energy storage devices to draw a specified amount of current at substantially the same time (e.g., simultaneously) from two or more energy storage devices being used to support the load. In this mode, the amount of current supplied by each energy storage device is designated as opposed to setting percentages or weight factors. Again, rapid cycling in this mode enables servicing of the load by drawing different portions of load current from different energy storage devices at the same time, but in this case within constraints for the amount of current that is supplied from each cell.

FIG. 3 further depicts an equivalent circuit model 306 for the energy storage device system 128. In particular, the equivalent circuit model 306 represents switching hardware 206 that can be used to provide current I to a load 308 using an arrangement of multiple battery energy storage devices 202. In the depicted example, four different battery cells 310(1)-310(4) are connectable to the load 308 via a switch 312. The switch 312 may be implemented as a solid state switch or other suitable hardware switching device. The example battery cells 310(1)-310(4) represent different heterogeneous batteries configured to provide respective amounts of current $I_1$, $I_2$, $I_3$, and $I_4$. The load current I may be supplied using one or a combination of the battery cells 310(1)-310(4). To do so, the switch 312 may be controlled via the control logic 208 to service the load in accordance with a determined power ratio as described previously. The switch 312 is also used to implement the various different switching modes described above and below. For instance the switch 312 may be positioned to select one of the battery cells 310(1)-310(4) and service the load via the selected cell. The switch 312 may also be cycled rapidly to different positions associated with different cells to effectively draw a portion of the overall current I at the same time from each battery. In this approach, the overall current I is supplied by summing the currents $I_1$, $I_2$, $I_3$, and $I_4$ supplied from each cell. (e.g., $I=I_1+I_2+I_3+I_4$). Portions of current obtained from each cell may be specified in various ways such as by associating percentages, weight factors, thresholds, or designated amounts with the cells.

Figure 4:
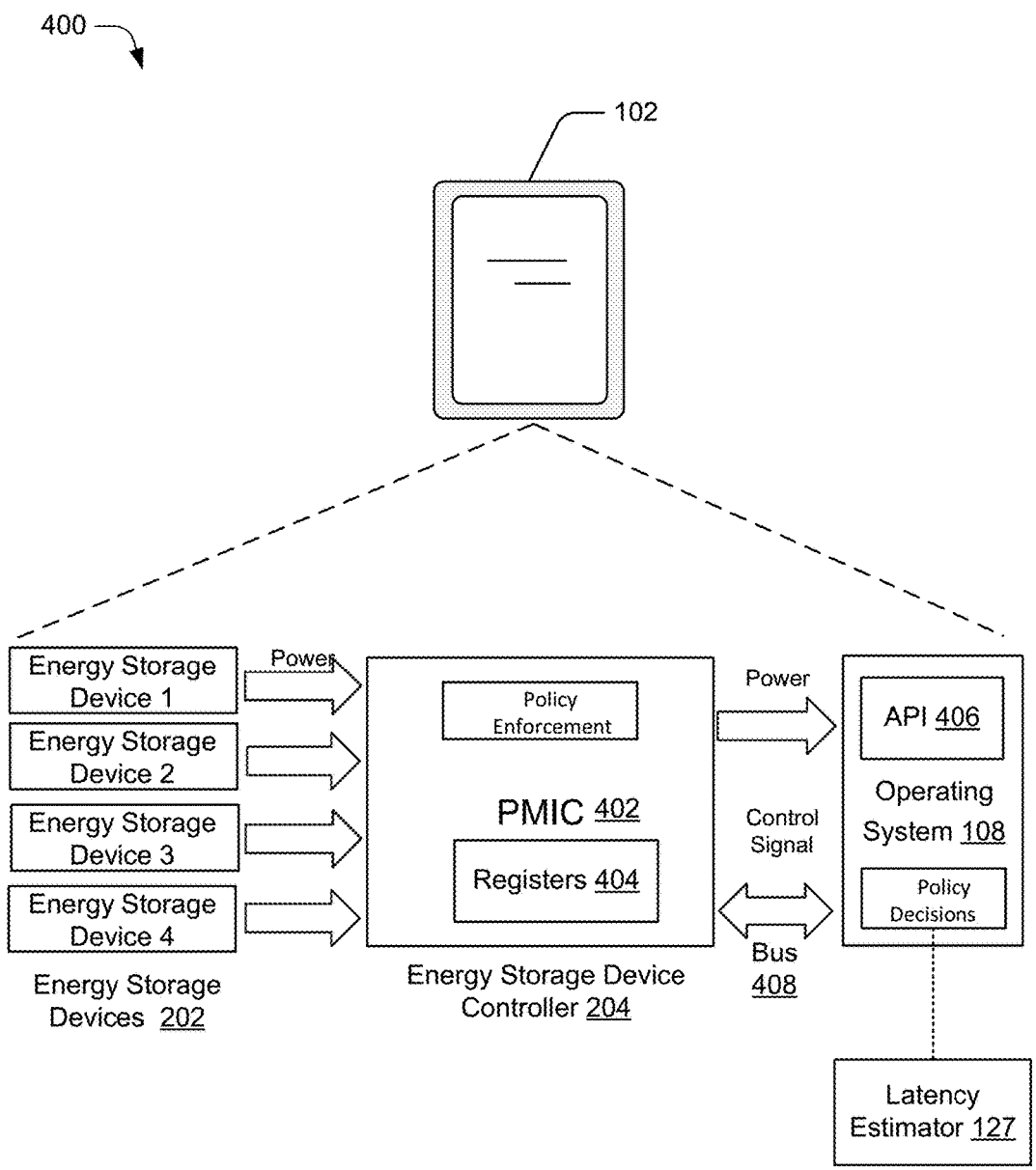
FIG. 4 depicts example details of a system having heterogeneous energy storage devices in accordance with one or more implementations.

FIG. 4 depicts generally at 400 example details of a system having heterogeneous energy storage devices in accordance with one or more implementations. In particular, the example of FIG. 4 depicts a system having energy storage devices 202 that may be integrated with a computing device 102. Power is supplied via the energy storage devices using the techniques discussed herein, such as via an energy storage device controller 204, which includes switching hardware 206 and control logic 208. In the depicted example, the energy storage device controller 204 is implemented via a power management integrated circuit (PMIC) 402 that is adapted to support heterogeneous energy storage device switching and latency-based energy storage device selection. For instance, in one or more implementations, the PMIC or other energy storage device controller is adapted to include registers 404 to facilitate policy enforcement of a switching policy. The registers 404 may be configured to hold various parameters that the control logic 208 makes use of to control operation of switching hardware 206 and supply power from the energy storage devices accordingly. For example, registers 404 may include registers indicative of the determined power ratio, the switching policy, a selected switching mode, a timing register, and battery cell specific registers indicative of battery states, characteristics, and designated current switching constraints (amounts, weights, percentages, thresholds, etc.). Registers may be assigned default values selected for general usage in typical scenarios. Registers may then be selectively adapted under the influence of the operating system and/or user input to implement policy settings for different use cases.

The registers 404 implemented by the energy storage device controller are exposed to enable operating system 108 and/or application 110 level control over switching. In other words, the registers 404 provide user accessible control over heterogeneous energy storage device switching. By way of example and not limitation parameter values for the registers 404 may be set and updated dynamically via an application programming interface (API) 406 that is exposed via the operating system 108 as represented in FIG. 4. API messages and or other control signals may be exchanged between the energy storage device controller 204 and operating system over a suitable communication bus 408, one example of which is an I²C bus. Information regarding energy storage device states, workload, and characteristics of energy storage devices 202 may also be communicated to the operating system 108 and/or schedule-power manager 126 via the control signals and/or API to facilitate assessments of the operational context and policy decisions based on the operational context.

Thus, as represented in FIG. 4, the operating system 108, by way of a power manager 126 or otherwise, may make policy decisions such as mode selection and energy storage device constraints setting for energy storage device switching. Policy decisions are made based upon performance parameters indicative of an operational context including at least information regarding battery states and characteristics obtained from the battery controller 204. As represented, policy decisions may be made under the influence of a latency estimator 127 that determines and supplies information regarding latency sensitivity of tasks, applications, workloads, and interaction scenarios. The API 406 provides a mechanism by which control signals are communicated to the energy storage device controller 204 to set the registers 404 in accordance with the policy decisions. Thus, the operating system 108 and/or power manager 126 may direct operation of energy storage device controller 204 to implement policy enforcement of a selected policy by setting the registers 404 and causing operation of switching hardware 206 to effectuate the operational modes and energy storage device constraints specified by the policy. Power is then supplied to the system via one or more of the energy storage devices in accordance with the policy decisions.

Example Procedures

Figure 5:
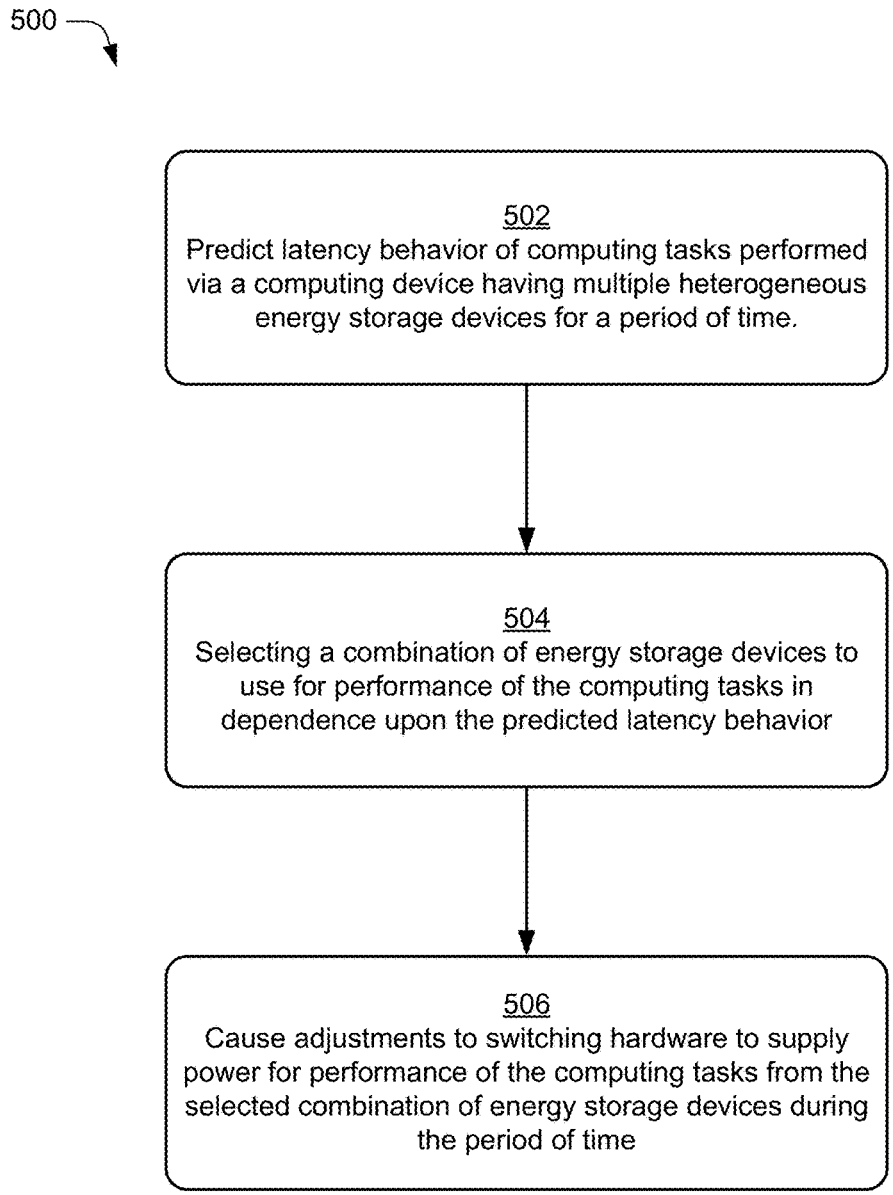
FIG. 5 is a flow diagram that describes details of an example procedure for latency-based energy storage device selection in accordance with one or more implementations
Figure 6:
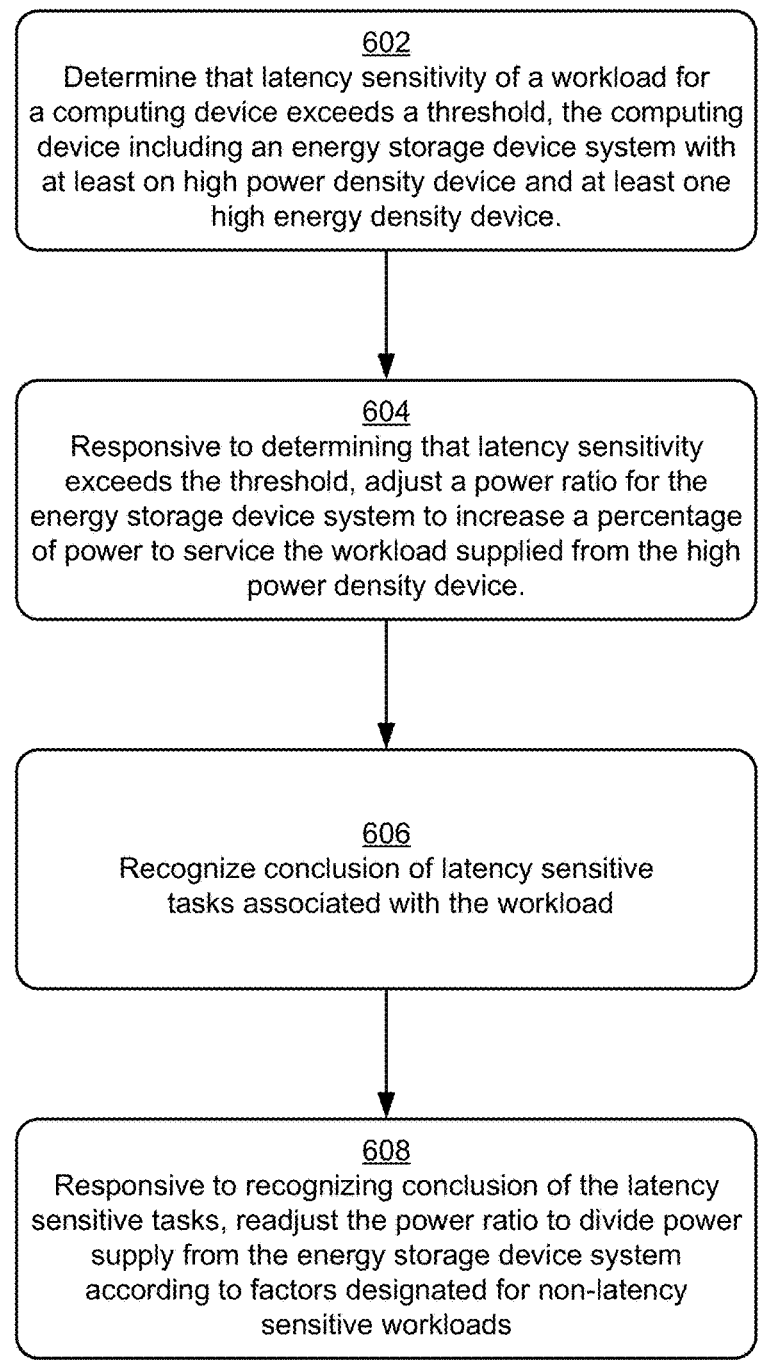
FIG. 6 is a flow diagram that describes details of another example procedure for latency-based energy storage device selection in accordance with one or more implementations.

Further aspects of latency-based energy storage device selection techniques are discussed in relation to example procedure of FIGS. 5 and 6. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

FIG. 5 is a flow diagram that describes details of an example procedure 500 for latency-based energy storage device selection in accordance with one or more implementations. The procedure 500 describes details of drawing power from multiple heterogeneous energy storage devices based upon latency considerations. The procedure 500 can be implemented by way of a suitably configured computing device, such as by way of an operating system 108, power manager 126, latency estimator 127, and/or other functionality described in relation to the examples of FIGS. 1-4.

Latency behavior of computing tasks performed via a computing device having multiple heterogeneous energy storage devices over a period of time is predicted (block 502). The latency behavior of tasks associated with the workload can be predicted in various ways as discussed above. The latency behavior can be determined, for example, based on an assessment of applications, tasks, and interaction scenarios that are currently being performed and/or are expected to be performed during a time period. This may involve analyzing applications that are launched and corresponding tasks associated with the applications. In one or more implementations, a data structure that correlates different items (e.g., applications, tasks, workloads, scenarios, etc.) with latency sensitivity values may be refereed to look-up applicable values. Additionally, predictions can be made based upon a similarity assessment of applications/tasks that are not enumerated in the data structure to items that are enumerated and mapped to latency sensitivity values via the data structure. In this approach, similar items may be assigned the same or similar latency sensitivity values.

A combination of energy storage devices to use for performance of the computing tasks is selected in dependence upon the predicted latency (block 504). For example, batteries or energy devices that are better suited to the particular level of latency sensitivity determined for the tasks may be selected or favored based on the analysis. As noted, higher power density devices may be favored in latency sensitive scenarios and higher energy density devices may be favored in situation that are not deemed latency sensitive. Power draws between available energy storage devices are adjusted according to the latency sensitive levels determined for the time period.

In particular, adjustments are caused to switching hardware to supply power for performance of the computing tasks from the selected combination of energy storage devices during the period of time (block 506). For example, a power manager 126 may operate to direct operation of an energy storage device controller 204 to implement policy decisions as previously discussed. In at least some implementations, this involves communications between the power manager 126 and energy storage device controller 204 effective to control switching hardware to draw levels of power for different energy storage devices as specified by the power manager. For example, different energy storage devices may be activated and deactivated based on determined policy settings. The policy settings are based at least partially upon latency considerations as described herein. In addition or alternatively, policy settings may specify power ratios that are mapped to the predicted latency behavior as described previously. In yet another example, the policy settings may be configured to cause implementation of different pre-established operating modes such as a high power mode, balanced mode, or low power mode. In this approach, power draws for different energy storage devices are specified by the selected mode. Accordingly, adjustments to power draws based on latency considerations may be made in various example ways enumerated as well as using other suitable techniques to change power draws for a set of heterogeneous energy storage devices in dependence upon assessments of latency behavior for computing tasks.

FIG. 6 is a flow diagram that describes details of another example procedure 600 for latency-based energy storage device selection in accordance with one or more implementations. The procedure 600 describes details of adjusting power draw between multiple heterogeneous energy storage device including high power density devices and high energy density device. The procedure 600 can be implemented by way of a suitably configured computing device, such as by way of an operating system 108, power manager 126, and/or other functionality described in relation to the examples of FIGS. 1-4.

A determination is made that latency sensitivity of a workload for a computing device exceeds a threshold. The determination is made in relation to a computing device including an energy storage device system with at least one high power density device and at least one high energy density device (block 602). For instance, latency sensitivity of a workload can be determined in various ways as discussed herein including using preset values or predicting latency sensitivity on demand. In one example, the determination is performed by comparing items associated with the workload to items contained in a data structure that correlates different tasks, applications, and scenarios to levels of latency sensitivity to assess latency sensitivity of the workload. Additionally, different threshold levels of latency sensitivity can be established and related to power management settings, such as power ratios or modes of operation as noted in this description. By way of example and not limitation, threshold levels for latency sensitivity may be correlated to different power ratios as represented and discussed in relation to Table 1 above. Accordingly, different determined levels of latency sensitivity may trigger different corresponding responses to adjust power draws between heterogeneous energy storage devices of an energy storage device system.

In particular, responsive to determining that latency sensitivity exceeds the threshold, a power ratio for the energy storage device system is adjusted to increase a percentage of power to service the workload supplied from the high power density device (block 604). Here, the level of latency sensitivity that is determined indicates that the workload may benefit from increased power supply and/or processing performance. Accordingly, the power ratio is adjusted accordingly to favor the high power density device. In other words, the balance of total power supplied by the energy storage device system may be adjusted to increase power from one or more high power density devices under appropriate circumstance. In some scenarios, a majority or bulk of the overall power is supplied via high power density devices when a corresponding threshold is exceeded. Moreover, in some instances just high power density devices may be employed, in which case other low power density devices (e.g., high energy density devices) may be suspended or shut-off.

Increased power supply favoring the one or more high power density devices may continue for a specified period of time as long as power from the devices remains available (e.g., the devices/battery cells have available charge) and the latency sensitive workload is ongoing. A return to a more balanced or different division of power draw may occur in response to conclusion of the latency sensitive workload and a corresponding change in the level of latency sensitivity.

In particular, conclusion of latency sensitive tasks associated with the workload is recognized (block 606). Here, the system recognizes that the particular tasks and/or interaction with applications that causes the elevated level of latency sensitivity are completed. Because of this, a corresponding drop in the level of latency sensitivity occurs and the system is able to detect this drop.

Responsive to recognizing conclusion of the latency sensitive tasks, the power ratio is readjusted to divide power supply from the energy storage device system according to factors designated for non-latency sensitive workloads. (block 608) In this case, power ratios are generally adjusted to rely more heavily on high energy density devices and preserve charge of the high power density devices for subsequent, higher demand tasks. For example, assuming that the drop in latency sensitivity falls below a lowest applicable threshold, power ratios may be adjusted to increase reliance upon high energy density devices and/or to minimize usage of high power density devices. Naturally, intermediate levels of latency sensitivity may prompt corresponding adjustments to power ratios to balance the division of power between high power density devices and high energy density devices accordingly. A range of such intermediate balances and power ratios between fully using high power devices/modes and fully using lower power devices/modes are contemplated. Generally, when latency sensitivity is determined to be at levels designated as high, action is taken to favor high power density devices to reduce latency. On the other hand, when latency sensitivity is determined to be below levels designated as high, action is taken to favor high energy density devices to conserve power for future computing tasks and workloads that may be latency sensitive.

Having considered the foregoing example details and procedures, consider now a discussion of an example system and components that may be employed for aspects of latency-based energy storage device selection in one or more implementations.

Example System

Figure 7:
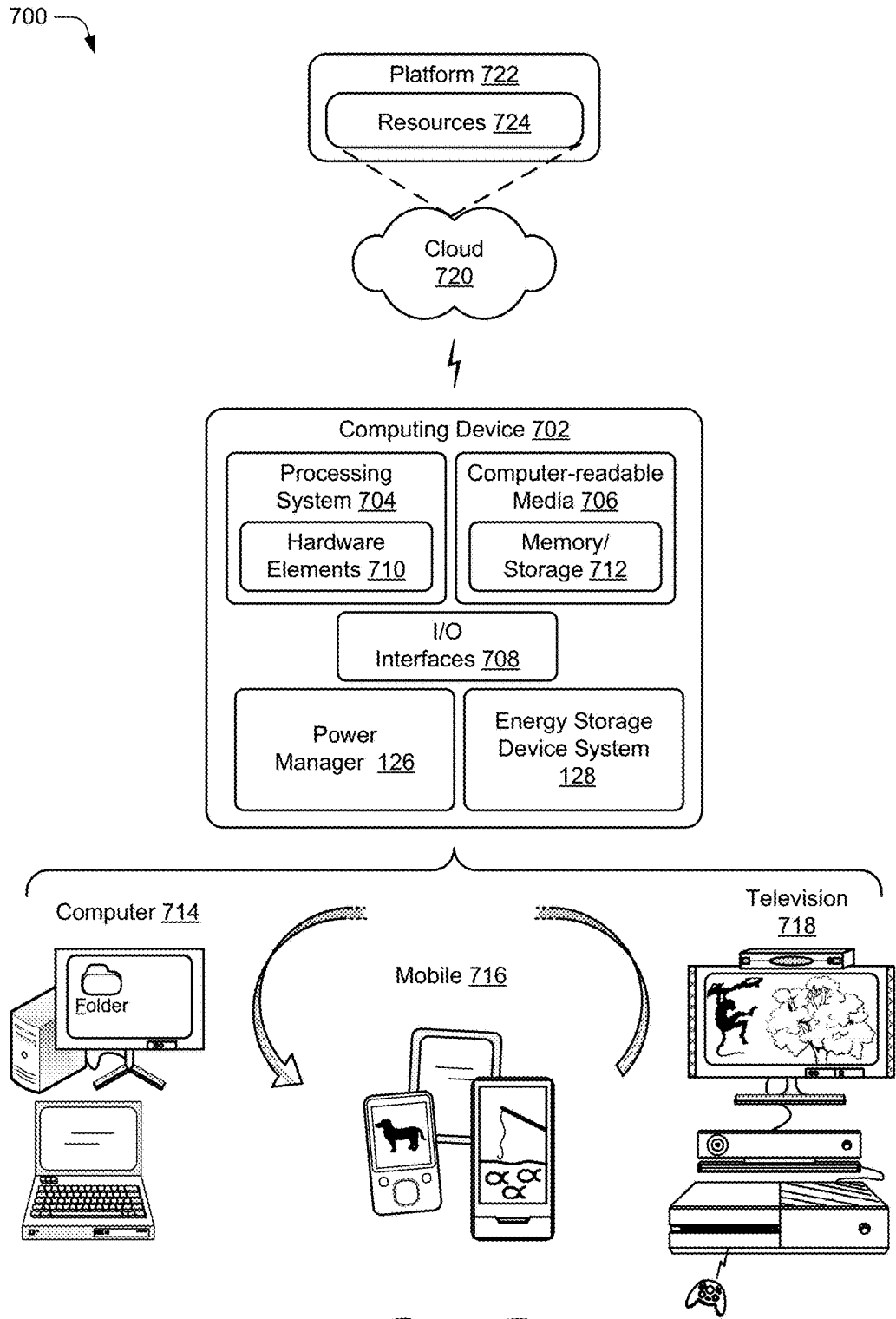
FIG. 7 illustrates an example system that includes an example computing device that is representative of one or more computing systems and/or devices that may implement the various techniques described herein.

FIG. 7 illustrates an example system 700 that includes an example computing device 702 that is representative of one or more computing systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 702, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, power manager 126, and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This is illustrated through inclusion of the power manager 126 and the energy storage device system 128 on the computing device 702. The functionality represented by power manager 126 and other modules/applications may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

EXAMPLE IMPLEMENTATIONS

Example implementations of techniques described herein include, but are not limited to, one or any combinations of one or more of the following examples:

Example 1

A method implemented by a computing device having multiple heterogeneous energy storage devices, the method comprising: predicting latency behavior of computing tasks performed via the computing device for a period of time; selecting a combination of energy storage devices to use for performance of the computing tasks in dependence upon the predicted latency behavior; and causing adjustments to switching hardware to supply power for performance of the computing tasks from the selected combination of energy storage devices during the period of time.

Example 2

The method as described in any one or more of the examples in this section, wherein predicting the latency behavior includes assessing latency sensitivity of individual computing tasks associated with a workload for the period of time and establishing overall latency sensitivity for the period of time based on the latency sensitivity for the individual computing tasks.

Example 3

The method as described in any one or more of the examples in this section, wherein predicting the latency behavior includes determining latency sensitivity associated with applications executing on the computing device for the period of time.

Example 4

The method as described in any one or more of the examples in this section, wherein predicting the latency behavior comprises referencing a data structure configured to correlate different computing tasks and applications to corresponding levels of latency sensitivity.

Example 5

The method as described in any one or more of the examples in this section, wherein selecting the combination of energy storage devices comprises: comparing predicted latency behavior to one or more defined threshold levels of latency sensitivity; determining a threshold level that corresponds to the predicted latency behavior; and setting a division of an overall power load between the multiple heterogeneous energy storage devices as designated for the threshold level that corresponds to the predicted latency behavior Example 6

The method as described in any one or more of the examples in this section, wherein causing adjustments to switching hardware comprises setting a power ratio for an energy storage system including the multiple heterogeneous energy storage devices to control power draw from the multiple heterogeneous energy storage devices as designated for the predicted latency behavior.

Example 7

The method as described in any one or more of the examples in this section, wherein the multiple heterogeneous energy storage devices are configured as multiple heterogeneous battery cells.

Example 8

The method as described in any one or more of the examples in this section, wherein: the multiple heterogeneous energy storage devices include at least one high power density device and at least one high energy density device; and selecting the combination comprises balancing a division of power draw between the high power density device and the high energy density device based on the predicted latency behavior.

Example 9

The method as described in any one or more of the examples in this section, wherein causing adjustments to switching hardware comprises communicating control signals to a controller for an energy storage system including the multiple heterogeneous energy storage devices and the switching hardware to direct operation of switching hardware to draw power from the selected combination of energy storage devices.

Example 10

The method as described in any one or more of the examples in this section, wherein the control signals are configured to designate a switching mode for the multiple heterogeneous energy storage devices based on the predicted latency behavior.

Example 11

A computing device comprising: an energy storage device system including multiple heterogeneous energy storage devices; and a power manager configured to direct operations of the energy storage device system to control power draw from the multiple heterogeneous energy storage devices based at least in part upon an assessment of latency sensitivity of a workload performed via the computing device for a period of time, including: causing a division of power draw between the multiple heterogeneous energy storage devices to favor high power density devices included with the multiple heterogeneous energy storage devices to reduce latency when latency sensitivity is at levels designated as high; and causing the division of power draw between the multiple heterogeneous energy storage devices to favor high energy density devices included with the multiple heterogeneous energy storage devices to conserve power for future workloads when latency sensitivity is below the levels designated as high.

Example 12

The computing device as described in any one or more of the examples in this section, wherein causing the division of power comprises: determining a power ratio based upon the assessment of latency sensitivity; and communicating the determined power ratio for use by the energy storage device system, thereby directing operation of switching hardware of the energy storage device system to apply the power ratio to implement the corresponding division of power draw.

Example 13

The computing device as described in any one or more of the examples in this section, wherein the power manager includes a latency estimator configured to perform the assessment of latency sensitivity for the workload including analyzing one or more of energy storage device characteristics, latency sensitivity of different tasks, application-specific latency considerations, estimated device usage, or estimated energy usage to predict latency sensitivity for the workload.

Example 14

The computing device as described in any one or more of the examples in this section, wherein the latency estimator is further configured to select a combination of energy storage devices to use for performance of the workload in dependence upon the predicted latency sensitivity, the division of power draw corresponding to the combination of energy storage devices that is selected.

Example 15

The computing device as described in any one or more of the examples in this section, wherein the power manager includes a power ratio estimator configured to derive a power ratio that specifies the division of power draw based upon the assessment of latency sensitivity.

Example 16

A computing device comprising: an energy storage device system with multiple heterogeneous energy storage devices including at least on high power density device and at least one high energy density device; one or more processors; and one or more computer-readable storage media having stored thereon instructions that, responsive to execution by the one or more processors, cause the one or more processors to perform operations including: determining that latency sensitivity of a workload for the computing device exceeds a threshold associated with high latency sensitivity; and responsive to determining that latency sensitivity exceeds the threshold, adjusting a power ratio for the energy storage device system to increase a percentage of power to service the workload supplied from the high power density device.

Example 17

The computing device as described in any one or more of the examples in this section, wherein the instructions further cause the one or more processors to perform operations including: recognizing conclusion of latency sensitive tasks associated with the work load; and responsive to recognizing conclusion of the latency sensitive tasks, readjusting the power ratio to divide power supply from the energy storage device system according to factors designated for non-latency sensitive workloads.

Example 18

The computing device as described in any one or more of the examples in this section, wherein the factors designated for non-latency sensitive workloads include one or more of predicted energy consumption, expected usage of the computing device, availability of charging opportunities, user behavior and schedules, geographic location, or characteristics of the energy storage device system.

Example 19

The computing device as described in any one or more of the examples in this section, wherein the instructions further cause the one or more processors to perform operations including: determining latency sensitivity of the workload by comparing items associated with the workload to items contained in a data structure that correlates different tasks, applications, and scenarios to levels of latency sensitivity.

Example 20

The computing device as described in any one or more of the examples in this section, the multiple heterogeneous energy storage devices have different characteristics including one or more of different sizes, capacities, technologies, chemistries, shapes, state of charge (SOC), age, temperatures, or cycle counts.

CONCLUSION

Although the example implementations have been described in language specific to structural features and/or methodological acts, it is to be understood that the implementations defined in the appended claims are not necessarily limited to the specific features or acts described. Rather, the specific features and acts are disclosed as example forms of implementing the claimed features.

What is claimed is:

1. A method implemented by a computing device having multiple heterogeneous energy storage devices, the method comprising:
   predicting latency behavior of computing tasks performed via the computing device for a period of time;
   selecting a combination of energy storage devices to use for performance of the computing tasks in dependence upon the predicted latency behavior; and
   causing adjustments to switching hardware to supply power for performance of the computing tasks from the selected combination of energy storage devices during the period of time.

2. The method of claim 1, wherein predicting the latency behavior includes assessing latency sensitivity of individual computing tasks associated with a workload for the period of time and establishing overall latency sensitivity for the period of time based on the latency sensitivity for the individual computing tasks.

3. The method of claim 1, wherein predicting the latency behavior includes determining latency sensitivity associated with applications executing on the computing device for the period of time.

4. The method of claim 1, wherein predicting the latency behavior comprises referencing a data structure configured to correlate different computing tasks and applications to corresponding levels of latency sensitivity.

5. The method of claim 1, wherein selecting the combination of energy storage devices comprises:
   comparing predicted latency behavior to one or more defined threshold levels of latency sensitivity;
   determining a threshold level that corresponds to the predicted latency behavior; and setting a division of an overall power load between the multiple heterogeneous energy storage devices as designated for the threshold level that corresponds to the predicted latency behavior.

6. The method of claim 1, wherein causing adjustments to switching hardware comprises setting a power ratio for an energy storage system including the multiple heterogeneous energy storage devices to control power draw from the multiple heterogeneous energy storage devices as designated for the predicted latency behavior.

7. The method of claim 1, wherein the multiple heterogeneous energy storage devices are configured as multiple heterogeneous battery cells.

8. The method of claim 1, wherein:
the multiple heterogeneous energy storage devices include at least one high power density device and at least one high energy density device; and
selecting the combination comprises balancing a division of power draw between the high power density device and the high energy density device based on the predicted latency behavior.

9. The method of claim 1, wherein causing adjustments to switching hardware comprises communicating control signals to a controller for an energy storage system including the multiple heterogeneous energy storage devices and the switching hardware to direct operation of switching hardware to draw power from the selected combination of energy storage devices.

10. The method of claim 9, wherein the control signals are configured to designate a switching mode for the multiple heterogeneous energy storage devices based on the predicted latency behavior.

11. A computing device comprising:
an energy storage device system including multiple heterogeneous energy storage devices; and
a processor to execute a power manager implemented as a software application to direct operations of the energy storage device system to control power draw from the multiple heterogeneous energy storage devices based at least in part upon an assessment of latency sensitivity of a workload performed via the computing device for a period of time, including:
causing a division of power draw between the multiple heterogeneous energy storage devices to favor high power density devices included with the multiple heterogeneous energy storage devices to reduce latency when latency sensitivity is at levels designated as high; and
causing the division of power draw between the multiple heterogeneous energy storage devices to favor high energy density devices included with the multiple heterogeneous energy storage devices to conserve power for future workloads when latency sensitivity is below the levels designated as high.

12. The computing device of claim 11, wherein causing the division of power comprises:
determining a power ratio based upon the assessment of latency sensitivity; and
communicating the determined power ratio for use by the energy storage device system, thereby directing operation of switching hardware of the energy storage device system to apply the power ratio to implement the corresponding division of power draw.

13. The computing device of claim 11, wherein the power manager includes a latency estimator to perform the assessment of latency sensitivity for the workload including analyzing one or more of energy storage device characteristics, latency sensitivity of different tasks, application-specific latency considerations, estimated device usage, or estimated energy usage to predict latency sensitivity for the workload.

14. The computing device of claim 13, wherein the latency estimator is further configured to select a combination of energy storage devices to use for performance of the workload in dependence upon the predicted latency sensitivity, the division of power draw corresponding to the combination of energy storage devices that is selected.

15. The computing device of claim 11, wherein the power manager includes a power ratio estimator to derive a power ratio that specifies the division of power draw based upon the assessment of latency sensitivity.

16. A computing device comprising:
an energy storage device system with multiple heterogeneous energy storage devices including at least one high power density device and at least one high energy density device;
one or more processors; and
one or more computer-readable storage media having stored thereon instructions that, responsive to execution by the one or more processors, cause the one or more processors to perform operations including:
determining that latency sensitivity of a workload for the computing device exceeds a threshold associated with high latency sensitivity; and
responsive to determining that latency sensitivity exceeds the threshold, adjusting a power ratio for the energy storage device system to increase a percentage of power to service the workload supplied from the high power density device.

17. The computing device of claim 16, wherein the instructions further cause the one or more processors to perform operations including:
recognizing conclusion of latency sensitive tasks associated with the work load; and
responsive to recognizing conclusion of the latency sensitive tasks, readjusting the power ratio to divide power supply from the energy storage device system according to factors designated for non-latency sensitive workloads.

18. The computing device of claim 17, wherein the factors designated for non-latency sensitive workloads include one or more of predicted energy consumption, expected usage of the computing device, availability of charging opportunities, user behavior and schedules, geographic location, or characteristics of the energy storage device system.

19. The computing device of claim 16, wherein the instructions further cause the one or more processors to perform operations including:
determining latency sensitivity of the workload by comparing items associated with the workload to items contained in a data structure that correlates different tasks, applications, and scenarios to levels of latency sensitivity.

20. The computing device of claim 16, the multiple heterogeneous energy storage devices have different characteristics including one or more of different sizes, capacities, technologies, chemistries, shapes, state of charge (SOC), age, temperatures, or cycle counts.

* * * * *